US006856314B2

(12) United States Patent
Ng

(10) Patent No.: US 6,856,314 B2
(45) Date of Patent: Feb. 15, 2005

(54) METHOD AND SYSTEM FOR 3D RECONSTRUCTION OF MULTIPLE VIEWS WITH ALTERING SEARCH PATH AND OCCLUSION MODELING

(75) Inventor: Kim Chai Ng, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 250 days.

(21) Appl. No.: 10/125,004

(22) Filed: Apr. 18, 2002

(65) Prior Publication Data

US 2003/0198377 A1 Oct. 23, 2003

(51) Int. Cl.$^7$ .............................................. G06T 15/40
(52) U.S. Cl. ...................... 345/421; 345/419; 345/420; 345/422; 382/128
(58) Field of Search ................................. 345/419, 420, 345/422, 421; 382/128

(56) References Cited

U.S. PATENT DOCUMENTS 5,537,494 A * 7/1996 Toh ............................ 382/242
6,297,825 B1 * 10/2001 Madden et al. ............. 345/419
6,345,112 B1 * 2/2002 Summers et al. ........... 382/128

OTHER PUBLICATIONS

C. Tomasi and R. Manduchi, "Stereo Without Search", *European Conference on Computer Vision*, pp. 452–465, 1996.
C. Tomasi and R. Manduchi, "Stereo Matching as a Nearest–Neighbor Problem", IEEE Transactions on Pattern Analysis and Machine Intelligence, vol. 20, No. 3, pp. 333–340, Mar. 1998.
Kim C. Ng, Mohan M. Trivedi, and Hiroshi Ishiguro, "Range–Space Approach for Generalized Multiple Baseline Stereo and Direct Virtual View Synthesis", *IEEE Workshop on Stereo and Multi–Baseline Vision*, Dec. 2001, pp. 1–10.
B. Heigl, R. Koch, M. Pollefeys, J. Denzler and L. Van Gool, "Plenoptic Modeling and Rendering from Image Sequences Taken by Hand–Held Camera", *Proc. of DAGM*, Sep. 1999, pp. 596–603.
S. Marapane and M. Trivedi, "Multi–Primitive Hierarchical (MPH) Stereo Analysis", *IEEE Transactions on Pattern Analysis and Machine Intelligence*, vol. 16, No. 3, Mar. 1994, pp. 227–240.
P. Rander, P. Narayanan and T. Kanade, "Recovery of Dynamic Scene Structure from Muliple Image Sequences", *Proc. Of International Conference on Multisensor Fusion and Integration for Intelligent Systems*, pp. 305–312, Dec. 1996.

(List continued on next page.)

*Primary Examiner*—Kimbinh T. Nguyen
(74) *Attorney, Agent, or Firm*—Stephen Bongini; Lisa K. Jorgenson

(57) ABSTRACT

An image processing system and method reconstructs 3D image information corresponding to a scene from a plurality of 2D images of the scene. The method receives a plurality of image features corresponded between different 2D views of the scene, the corresponded image features deviating between different views as a result of camera relative motion. The method determines image features of the received plurality of image features that are occluded views, determines image features of the received plurality of image features that are confident seeds associated with 3D depth information, and propagates 3D depth information from the confident seeds to neighboring image features, while avoiding image features that have been determined to be occluded views. The 3D image information can be rendered and displayed such as for a virtual walkthrough of the scene.

35 Claims, 9 Drawing Sheets

OTHER PUBLICATIONS

Kim C. Ng, Mohan M. Trivedi and Hiroshi Ishiguro, "Generalized Multiple Baseline Stereo and Direct Virtual View Synthesis Using Range–Space Search, Match and Render", *International Journal of Computer Vision*, 2002, pp. 1–13.

Kim C. Ng, "3D Visual Modeling and Virtual View Synthesis: A Synergetic, Range–Space Stereo Approach Using Omni–Directional Images", Ph.D. Dissertation, University of California, San Diego, Mar. 2000, Chapters 5–8.

Kim C. Ng, Mohan Trivedi and Hiroshi Ishiguro, "Ubiquitous Vision System: Virtual View Synthesis by Integrating Wide–Baseline Stereo and View Rendering", *IEEE Multimedia Journal*, Sep. 2001, pp. 1–18.

Kim C. Ng, Mohan Trivedi and Hiroshi Ishiguro, "3D Ranging and Virtual View Generation Using Omni–view Cameras", *Proc. Multimedia Systems and Applications, SPIE*, vol. 3528, Boston, Nov. 1998.

Kim C. Ng, Hiroshi Ishiguro, Mohan Trivedi and Takushi Sogo, "Monitoring Dynamically Changing Environments by Ubiquitous Vision System", *IEEE Workshop on Visual Surveillance*, Colorado, Jun. 1999, pp. 67–73.

Kim C. Ng, Hiroshi Ishiguro, Mohan Trivedi and Takushi Sogo, "An Integrated Surveillance System—Human Tracking and View Synthesis Using Multiple Omni–Directional Vision Sensors", *Image and Vision Computing Journal*, Jun. 2002.

Kim C. Ng, Hiroshi Ishiguro and Mohan Trivedi, "Multiple Omni–Directional Vision Sensors (ODVS) Based Visual Modeling Approach", Conference & Video Proc. Of IEEE Visualization, San Francisco, California, Oct. 1999.

K. Kutulakos and S. Seitz, "A Theory of Shape by Space Carving", International Journal of Computer Vision, vol. 38, No. 3, pp. 199–218, Mar. 2000.

George Chen and Gerard Medioni, "Practical Algorithms for Stratified Structure–from–Motion", Image and Vision Computing, vol. 20, pp. 103–123, received Aug. 16, 2000; received in revised form on Aug. 11, 2001 and accepted on Nov. 6, 2001.

* cited by examiner

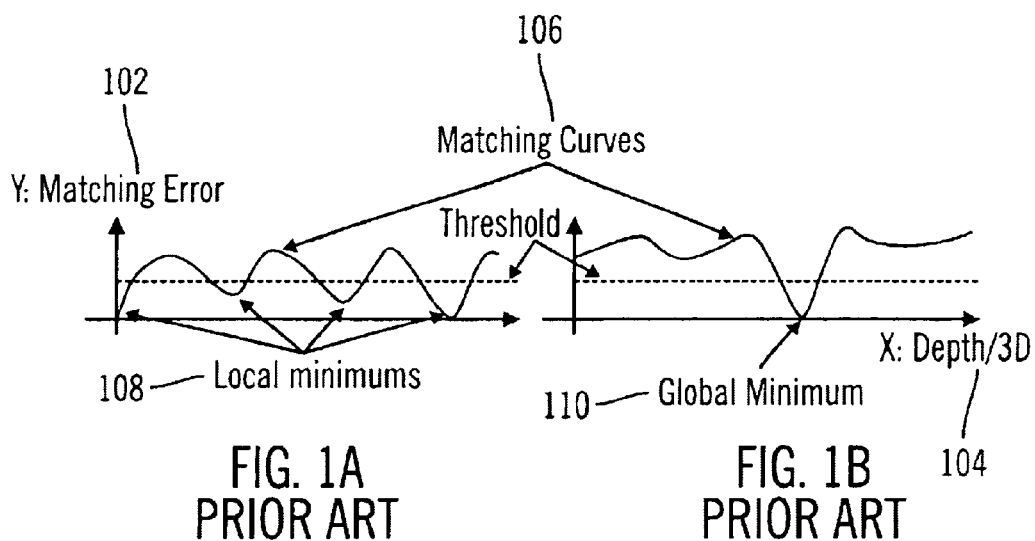
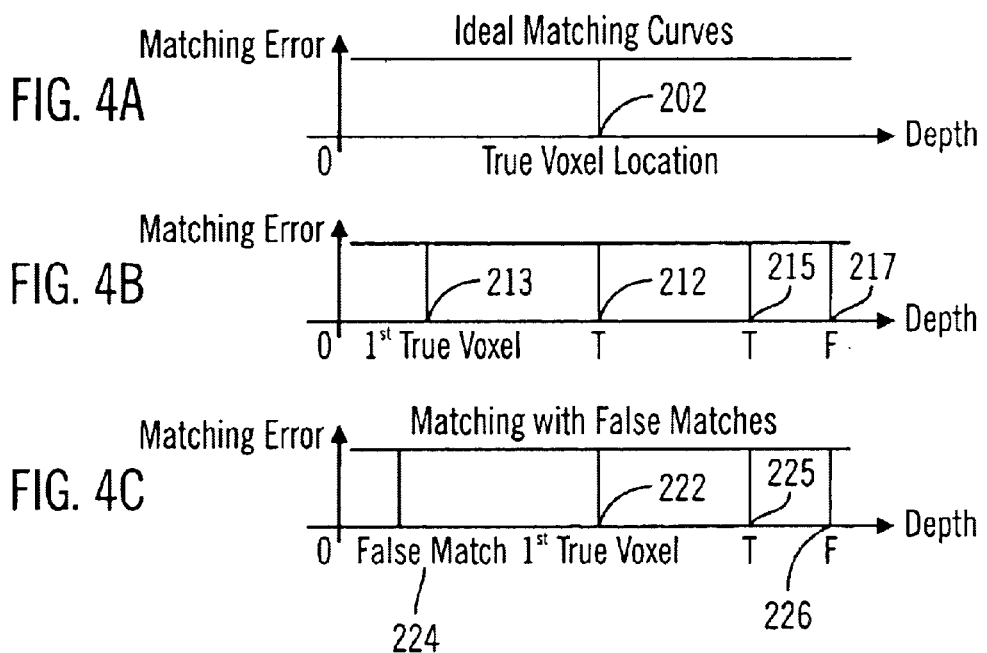

$P_1 \Rightarrow f(R_1, G_1, B_1) = C_1$ $P_{21} \Rightarrow f(R_{21}, G_{21}, B_{21}) = C_{21}$ $P_{22} \Rightarrow f(R_{22}, G_{22}, B_{22}) = C_{22}$ $P_{31} \Rightarrow f(R_{31}, G_{31}, B_{31}) = C_{31}$ $P_{32} \Rightarrow f(R_{32}, G_{32}, B_{32}) = C_{32}$ at D1, Matching Error $= \sqrt{(C_1 - C_{21})^2 + (C_1 - C_{31})^2}$ at D2, Matching Error $= \sqrt{(C_1 - C_{22})^2 + (C_1 - C_{32})^2}$

METHOD AND SYSTEM FOR 3D RECONSTRUCTION OF MULTIPLE VIEWS WITH ALTERING SEARCH PATH AND OCCLUSION MODELING

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure as it appears in the United States Patent and Trademark Office patent file or records, but otherwise reserves all copyright rights whatsoever.

FIELD OF THE INVENTION

This invention generally relates to the field of image processing systems and methods, and more particularly relates to methods of reconstructing a 3D image representation of a scene from multiple 2D image views thereof.

BACKGROUND OF THE INVENTION

As part of reconstructing three dimensional (3D) information from a plurality of two dimensional (2D) image views of a scene, an image processing system typically first finds and matches corresponding pixels across the plurality of 2D image views. To recover 3D information from a given number of 2D images, an essential step is to find/match the corresponding pixels to each pixel in a view. These corresponding pixels typically are the resulting projection of a voxel back into these 2D image views.

A common way of finding these corresponding pixels for each pixel in a view is to optimize and match a matching objective function. Matching is a similarity measurement of the corresponding pixels. The lower the matching error is, the more similar the corresponding pixels are. Nevertheless, matching algorithms often find many different sets of corresponding pixels to be potential matches.

As illustrated in FIG. 1, these potential matches, when shown on a matching curve 106, are indicated by local minimums 108, which are below a predefined threshold value, along a search path on the curve from zero outwardly following the X-axis 104. The search path translates into 3D depth values for a pixel's matching curve measured along the X-axis. The Y-axis 102 translates into matching error values for the pixel's matching curve measured along the Y-axis. A matching curve is associated with each pixel/feature in a view to be corresponded across the plurality of views.

A definite depth value for a pixel is difficult to be determined at the presence of multiple local minima 108. The goal of optimization algorithms have been to reduce these local minimums 108 into a global minimum 110. Still, a global minimum 110 does not guarantee the correct depth for a pixel. This is especially true when the scene has a large region without texture.

In reality, both types of matching curves, i.e., with local minima and with global minimum, always co-exist within the pixels of a view. More often a matching curve yields local minima rather than a global minimum.

Recent work by the present inventor, was disclosed in a publication entitled "3-D Visual Modeling and Virtual View Synthesis: A Synergistic, Range-Space Stereo Approach Using Omni-Directional Images", in November 2000. The published approach discusses making use of characteristics of matching curves for robust matching. The disclosed method searched, matched, and rendered directly in 3D space along virtual space, starting from a given virtual viewpoint. A virtual viewpoint is a viewpoint which does not coincide with the real camera's projection center. The searching interval was non-uniform, depending upon the image resolution and the camera arrangement. The incremental voxels on the virtual rays are backward-projected to the cameras, searching for the best correspondence. The matching attributes were saved. A 3D region growing method was applied based on the characteristics of a matching curve with Continuity Constraint. This disclosed method lacks many features and benefits that are recognized for the present invention as will be discussed in the Description of the Preferred Embodiments section below.

One important general comment about most matching algorithms is that they perform matching and then try to eliminate false matches. After that they either choose the lowest error at each pixel as the best match or pick a sparse number of global minimums to interpolate the rest of the pixels with algorithms, such as Spline or Lagrance. These schemes can produce gross errors, even when many cameras are employed. In the real world, it is difficult to obtain a reliable global minimum. Multiple local minimums always exist in the searching process. The apparent global minimum can be deceiving, especially when a scene has rather homogeneous color. Even when a global minimum exists along a virtual ray, an estimated range can always be far away from it's true 3D location because the lowest error can fall into various homogeneous locations. The estimated range can vary widely from it's neighboring pixels.

Therefore a need exists to overcome the problems with the prior art as discussed above, and particularly for a robust and reliable method for an image processing system to reconstruct 3D image representation from multiple 2D image views.

SUMMARY OF THE INVENTION

According to a preferred embodiment of the present invention, a method of reconstructing 3D image information from a plurality of 2D images of a scene comprising the steps of: receiving a plurality of image features corresponded between different 2D views of a scene, the corresponded image features deviating between different views as a result of camera relative motion; determining image features of the received plurality of image features that are occluded views; determining image features of the received plurality of image features that are confident seeds associated with 3D depth information; and propagating 3D depth information from the confident seeds to neighboring image features, while avoiding image features that have been determined to be occluded views.

According to a preferred embodiment of the present invention, an image processing system comprises a memory; a controller/processor electrically coupled to the memory; a 3D image reconstructor, electrically coupled to the controller/processor and to the memory, for receiving a plurality of image features corresponded between different 2D views of a scene, the corresponded image features deviating between different views as a result of camera relative motion; determining image features of the received plurality of image features that are occluded views; determining image features of the received plurality of image features that are confident seeds associated with 3D depth information; and propagating 3D depth information from the confident seeds to neighboring image features, while avoiding image features that have been determined to be occluded views.

Preferred embodiments of the present invention can be implemented in at least one of an integrated circuit and a circuit supporting substrate. Further, a preferred system implementation can provide a virtual walkthrough of a scene using 3D image information reconstructed from a plurality of 2D views of the scene.

BRIEF DESCRIPTION OF THE DRAWINGS

FIGS. 1A and 1B show two graphs illustrating exemplary matching curves, showing local minima and a global minimum.

FIGS. 4A, 4B, show two graphs illustrating exemplary ideal matching curves, while FIG. 4C shows a graph illustrating a matching curve with false matches.

DESCRIPTION OF THE PREFERRED EMBODIMENTS

Figure 2:
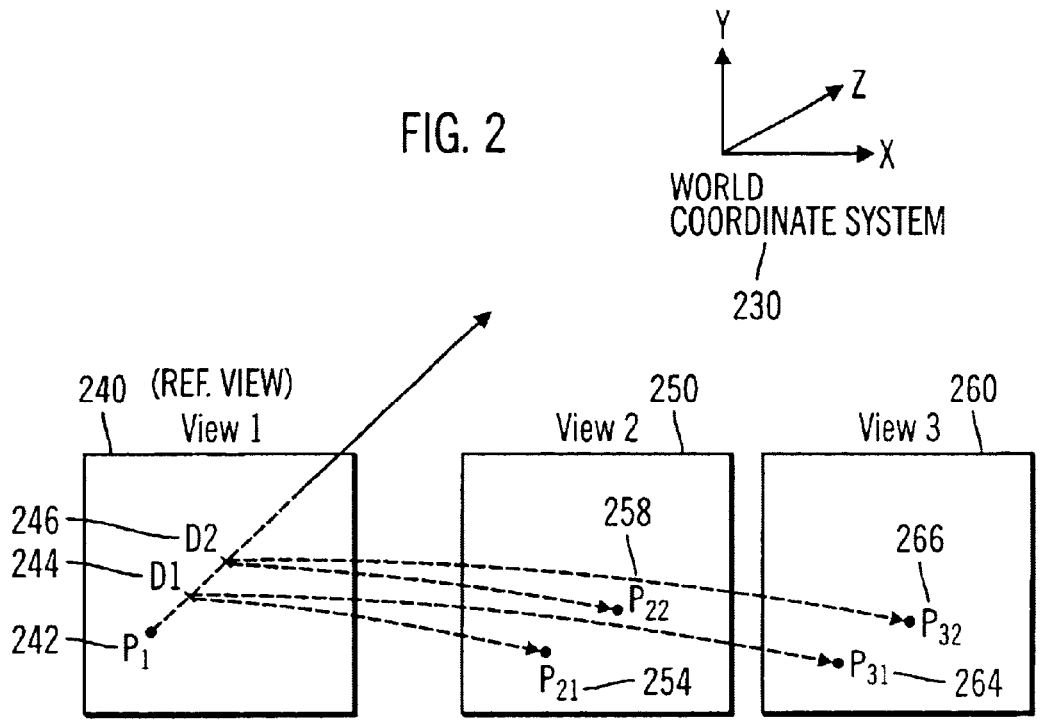
FIG. 2 shows three 2D views of a 3D scene, and illustrates exemplary calculation of points on an exemplary matching curve for a pixel in a reference view of the scene.

It is important to note that the embodiments discussed herein are only examples of the many advantageous uses of the innovative teachings herein. In general, statements made in the specification of the present application do not necessarily limit any of the equivalent and various claimed inventions. Moreover, some statements may apply to some inventive features but not to others. In general, unless otherwise indicated, singular elements may be in the plural and visa versa with no loss of generality.

According to a preferred embodiment of the present invention, an image processing system and method takes advantage of certain characteristics of matching curves of a plurality of views of a scene. Such characteristics were previously unrecognized by known prior art systems and methods for 3D reconstruction of image information of a scene. Advantageously, the preferred system and methods, according to the present invention, more reliably determine consistent 3D depth information for objects in a scene being viewed via a plurality of 2D image views.

A preferred method, according to the present invention, recognizes that both local minima and global minimum type matching curves always co-exist within a view. More common are the matching curves that comprise local minima. A preferred method derives depth information more robustly by exploiting the characteristics of matching curves of multiple views and even if only local minima exist (no need for global minimum) in matching curves, as will be discussed below. A main robustness comes from consistency checking among the multiple 2D views. Additionally, the 2D views that contribute high error in a matching process of the local minimum are identified and recorded as occluded views. These occluded views will be excluded from influencing the final results of determining a depth of a pixel at the particular local minimum of a matching curve. Every local minimum has these occluded views recorded. Additionally, as will be discussed below, the searching process of the corresponding pixels in the other views is traveling through a very different image path from a different viewpoint; some local minimums on the matching curve could be avoided by looking from this different viewpoint. The preferred method, unlike prior art methods, does not assume the true match is at the lowest minimum along a matching curve.

Most matching algorithms in the past have performed matching and then they try to eliminate false matches. After that they either choose the lowest error at each pixel as the best match or pick a sparse number of global minimums to interpolate the rest of the pixels with algorithms, such as Spline or Lagrance. These schemes tend to produce gross errors, even when many cameras are employed. Real world implementations of 3D image reconstruction systems have found it very difficult to obtain a reliable global minimum in a matching curve. Typically, multiple local minimums always exist in a searching process to determine depth information from matching curves. An apparent global minimum can be deceiving, especially when the scene has rather homogeneous color. Even when a global minimum exists an estimated range can always be far away from its true 3D depth location because the lowest error can fall into various homogeneous locations. The estimated range can vary widely from its neighboring pixels.

According to a preferred embodiment of the present invention, a preferred method simultaneously and consistently reconstructs 3D information of a scene from a plurality of 2D views of the scene based on the effects of altering search path and occlusion modeling, as will be discussed below. In accordance with a preferred embodiment of the present invention, a preferred method includes the following steps, which will be discussed in more detail further below.

1). Perform searching and matching concurrently for each pixel in every view.
2). Record matching curves' attributes concurrently for each pixel in every view during the searching and matching process. Each pixel is associated with at least one matching curve, such as a matching curve of a color match and/or a matching curve of a color-edge match.
3). Use matching curves characteristics of multiple 2D views to locate confident seeds for affecting the results of their neighboring pixels and their non-occluded corresponding pixels.

4). Use matching curve characteristics of multiple views to propagate good matches along the edges in a reference view and in its non-occluded corresponding views. Every view itself is a reference view; the other views with pixels being corresponded to the pixels of the reference view are corresponding views.

5). Use matching curve characteristics of multiple views to propagate good matches from the edge portions into the homogenous regions of a reference view and its non-occluded corresponding views.

More specifically, method steps 1 and 2 acquire information from searching and matching. The search and match are performed concurrently for every pixel at every view. Every pixel in every view will have at least one matching curve, such as a matching curve of a color match and/or a matching curve of a color-edge match. Each matching curve has the possibility of multiple error regions. A local minimum is bounded within an envelope of an error region. An envelope begins when the matching error is the first time lower than a set threshold and ends when the matching error is higher than the threshold. Attributes of the matching curve are descriptions of the local minimum, as will be discussed in more detail below. The matching curves attributes are recorded for later use in subsequent steps 3–5.

Given a voxel to-be-corresponded along the search path of a subject pixel, its corresponding outlier pixels (i.e., those pixels being corresponded that do not match the color and/or other characteristics of the subject pixel and/or of their neighboring pixels) are recorded and considered as the occurrence of occlusion. These occluded pixels will be excluded from influencing the results from method steps 3 through 5 for that particular error region of the subject pixel. Outliers are the corresponding pixels that contribute high error in the matching process. Outliers may be determined from such attributes as having a significantly different color, brightness, hue, or other features, from their immediate neighbor pixels. These outliers are identified to be occluded views and then recorded as such to avoid these occluded views from influencing the determination of depth information of their neighboring pixels. Preferably, such as to reduce the usage of memory, an image processing system stores this occluded view information only at the local minimum of an error region. The local minimum within every error region preferably has this occlusion information recorded.

In steps 3–5, the seeds finding and growing process are cross-checked for consistency among all of the non-occluded corresponding views at a depth-to-be-determined. A depth, which is determined within an error region in one view, has to be inside an error region of other non-occluded corresponding views. In addition, the characteristics of the subject pixels matching curve and the characteristics of the corresponding pixels matching curve in the other non-occluded corresponding views have to match with the intended characteristics-pair. The intended characteristics-pair are specified and different at the sequence of growing stages. When the criteria meet, the non-occluded corresponding view is consistent at the determined depth. The depth is thus grown/revealed simultaneously at all of the consistent, non-occluded corresponding views.

Step 3 comprises a process for finding the confident seeds. A voxel to-be-determined at the local minimum of an error region (of an edgel) can become an initial seed only when its projected pixels are also on the edges of corresponded views of the scene. These reference edgels and their non-occluded corresponding edgels normally should have a single error region for a color matching curve and also for a color-edge matching curve. The local minimum of the color match lies at the same voxel location as the color-edge match. This confident seed voxel location is common at the local minimum of a subject pixel and all of its other non-occluded corresponding pixels.

At steps 4 and 5, a preferred method propagates the confident seed voxels to their less certain neighbor pixels in each reference view. The process is iterative and has various stages. A newly grown pixel/voxel will become a confident seed in subsequent iterations and stages. The growing process stops when there is no pixel in the input views that can further meet the growing criteria in that stage. The main difference between Step 4 and Step 5 is that at Step 4 both a subject pixel and its non-occluded corresponding pixels are located on the edge regions of surfaces in the respective views. At step 5, the subject pixel and its non-occluded corresponding pixels are located on the homogeneous regions of surfaces in the respective views.

According to a preferred embodiment of the present invention, to ensure meeting a surface continuity constraint for all pixels that are located in a common surface in the scene, a confident seed pixel/voxel can propagate into its 8-neighbor pixels only if the seed voxel is contained within the volume of one of its 8-neighbor pixels' error regions of their respective matching curves and the seed voxel is preferably within one-step search length away from the local minimum of that respective error region. The term one-step search length away means one voxel length away, where it is clear that a voxel can vary by size and shape typically based on the camera configuration and image resolution. Additionally, it is understood that a voxel can propagate beyond the 8-neighbor pixels. However, the preferred method conditions any propagation of the voxel to the 8-neighbor pixels by requiring meeting the two conditions, i.e., the seed voxel is contained within the volume of one of its 8-neighbor pixels' error regions and the seed voxel is preferably within one-step search length away from the local minimum. A voxel to-be-determined at a local minimum of the reference pixel, i.e., a subject pixel in the reference view, is crosschecked for consistency among all of the non-occluded corresponding pixels. If the voxel to-be-determined is also contained within an error region of the non-occluded corresponding pixels, then the voxel location is assigned to both the subject pixel and the non-occluded corresponding pixels that have the voxel contained within its respective error region. This assumes that the intended matching curve characteristics-pair is satisfied. That is, the characteristics of the subject pixel matching curve and the characteristics of its non-occluded corresponding pixels' matching curves, respectively, have to match with the intended characteristics-pair as follows. Preferably, the intended characteristics-pair are specified using the following sequence of growing stages. The stages go in the following order: (1) the subject pixel with a single error region versus its non-occluded corresponding pixels with a single error region; (2) the subject pixel with a single error region versus its non-occluded corresponding pixels with multiple error regions; (3) the subject pixel with a single or multiple error regions versus its non-occluded corresponding pixels with a single error region; (4) the subject pixel with a single or multiple error regions versus its non-occluded corresponding pixels with a single or multiple error regions. Note that propagation preferably follows the sequence of stages described above. These stages sequence from more reliable to less reliable matching curve characteristics. Note also that propagation is preferably done first about the edge portions (e.g., at edgels) and then propagation continues to the homogeneous regions. This again applies propagation to pixels from more reliable subject pixels to less reliable subject pixels. Following the stages, first, propagation from seeds is done using subject pixels with a single error region and with non-occluded corresponding pixels also having a single error region. After propagation is done for this first stage for all subject pixels meeting this matching curve characteristic requirement, then the propagation is done for pixels meeting the second stage characteristics for their matching curves. This sequence is repeated for the third stage and then the fourth stage, thereby propagating from seed pixels to neighboring pixels first by propagating to the subject pixels with the most reliable matching curve characteristics and following the stages to lastly propagate to those remaining subject pixels that have the least reliable matching curve characteristics.

The fundamental guiding principle of the volume growing process is to proceed from regions of high certainty to regions of lesser certainty. Edgels are more certain than the homogeneous regions; single local minimum is also more certain than multiple local minima. An edgel with a single local minimum is therefore more certain than an edgel with multiple local minima. Accordingly, the preferred method applies the four stages first to the edgels and then continues applying the four stages to pixels about the edge portion and then to the pixels in the homogeneous region.

When there are more than one seed voxel surrounding a subject pixel, the first qualified error region, which is closer to the camera viewpoint than the other qualified error regions, will determine the assigned depth. This normally ensures the front voxel occludes the back voxels on a viewing frustrum. The preferred method according to the present invention does not assume every pixel meets a uniqueness constraint (i.e., that only a single true match/voxel exists per pixel). Another advantage of the preferred method not assuming that each pixel meets the uniqueness constraint is that the method may deal well with object transparency effects. After iterating through the four stages in Step 4 with the condition that the confident seed voxel has to be at most one-step search length away from the local minimum of an error region, the preferred method repeats the four stages with a relaxed condition. When the local minimum of an error region is further than one-step search length apart from the confident seed voxel, the relaxed condition pulls a voxel to-be-determined to the position within the seed voxel's one-step search length, instead of using the voxel at that local minimum. This correction mechanism again ensures the Continuity Constraint is being met while growing a surface. A depth discontinuity is detected when a confident seed voxel is not bounded within any of its 8-neighbor pixel's error region of their respective matching curves.

With the consistency check among the non-occluded corresponding views, the matching becomes more robust than using only the matching information of a single view. The determined-depth has to satisfy not only the surface continuity constraint, but also the consistency among the non-occluded corresponding views. The searching process of a subject pixel in the other views travels through a very different image path; some local minimums on the matching curve could be avoided by using a different viewpoint. When most of the non-occluded corresponding views agree upon the depth being determined, then the answer is more statistically correct. The consistency among non-occluded corresponding views also overcomes the problem of image homogeneity, which creates difficulty and errors in most other matching algorithms.

Advantageously, with the consistency check among the non-occluded corresponding views, while leaving out the occluded views, the matching process becomes very robust. This is a significant advantage of the present invention that is not found in any known prior art system. Very importantly, the determined depth has to satisfy not only the continuity constraint from pixel to neighboring pixel, but it also has to satisfy the consistency requirement among the non-occluded corresponding views for the same subject pixel.

The searching process of the corresponding pixel in the other non-occluded views is traveling through a very different image path from a different viewpoint. Therefore, some local minimums on the matching curve could be avoided by looking from this different viewpoint. When most of the non-occluded corresponding views (or at least a plurality of non-occluded corresponding views) agree upon the depth being determined, the answer is more statistically correct. The consistency among non-occluded corresponding views also overcomes the problem of image homogeneity, which creates difficulty and errors in most other matching algorithms.

A matching curve is created for each pixel of a 2D view of a 3D scene. The matching curve describes the interrelationship between 3D depth values for a surface of an object in a 3D scene being viewed through the pixel of the 2D view. The pixel is projected through a pixel frustum to a viewpoint, or surface of an object, in a 3D scene.

Although matching curves can be created in many different ways, as should be obvious to those skilled in the art, for the present discussion we will illustrate an exemplary method to create matching curves that could be used by a preferred embodiment of the present invention. Referring to FIG. 2, an exemplary 3-dimensional scene is viewed from multiple 2-dimensional views such as illustrated by a first view 240, a second view 250, and a third view 260. In this example, the three 2D views correspond to three cameras that are viewing a 3D scene. The precise position of the three cameras is known in a world coordinate system 230 that defines 3-dimensional location information to each of the three cameras and to surfaces of objects that are visible in the 3D scene.

Each of the three 2D views comprises a plurality of pixels that constitute a 2D image for each 2D view. Each pixel is associated with attributes of the image being viewed. For example, a pixel, such as P1 242 shown in the first view 240 may have associated with the pixel certain color information, such as values for R, G, and B, and also may include information such as brightness (luminescence), and for monochrome images may include gray scale. In this example, for the sake of simplicity, we will only look at color information associated with each pixel in each view, where the color information is defined by the three values for R, G, and B. However, other ways of representing color information for each pixel may be used in alternative implementations, as should be obvious to those skilled in the art. The pixel P1 242 has associated with it a color value C1, which is a function of the three values for R1, G1, and B1. This color value C1 associated with the pixel P1 242 indicates the color information being represented at the pixel P1 for representing the 3-dimensional scene being viewed from the first view 240.

An exemplary method for creating a matching curve 350 (see FIG. 3) for the pixel P1 242 will be shown below. The pixel P1 242 has associated with it a color value C1, as has been discussed above. This color value C1 remains the same for pixel P1 as viewed for different depths into the first view 240. This first view 240 is designated a reference view which will then be used to correspond the pixel P1 242 to other 2D views of the same scene. At a first depth 244 the pixel P1 242

(in the first view 240) is corresponded to a pixel P21 254 in the second view 250. Similarly, at the first depth 244 the pixel P1 242 in the first view 240 is corresponded to a pixel P31 264 in the third view 260. This correspondence between the first view 244 and the second view 250 and the third view 260 can be accomplished through alternative methods of matching and corresponding pixels across the multiple views, as should be obvious to those skilled in the art in view of the present discussion. For example, the pixel P1 242 in the first view 240 can be back-projected from an estimated voxel position at the first depth 244 to correspond with the pixel P21 254 in the second view 250 and to correspond to the pixel P31 264 in the third view 260.

Note that the pixel P21 254 in the second view 250 has associated with it color information which is a function of the values for R21, G21, and B21, which results in a color value C21 for the pixel P21 254. Similarly, the pixel P31 264 in the third view 260 has a color value C31. In similar fashion, at a second depth D2 246 a voxel for the pixel P1 242 of the first view 240 can be corresponded to the pixel P22 256 in the second view 250 and corresponded to the pixel P32 266 in the third view 260. The color of the pixel P22 256 is defined by the color value C22, and the color of the pixel P32 266 of the third view 260 is defined by the color value C32.

A matching curve 350 (see FIG. 3) can be defined for the pixel P1 242 of the first view 240 by using, for example, a sum of square differences method of calculating a matching error at each of the proposed depths for a voxel for the pixel P1 242. A voxel identifies depth information associated with the corresponding pixel P1 242. The sum of square differences method is computed for the different proposed depths for a voxel, such as at the first depth D1 244 and at the second depth D2 242, by taking the square root of the sum of the square differences of the color values of the reference view pixel P1 242 and it's corresponding pixels at the other views, such as at the second view 250 and at the third view 260. See the equations shown in FIG. 2 for calculating matching error at the first depth D1 244 and at the second depth D2 246. Matching error (Y-axis) 340 is illustrated in FIG. 3 being plotted against depth (X-axis) 330 for a matching curve 350.

At the first depth D1 244 a first point 334 is calculated on the matching curve 350. At the second depth D2 246 a second point 336 is calculated on the matching curve 350. Recall that, although in FIG. 3 the depth information is shown linearly along the X axis 330, each of the prospective voxels that is being calculated for matching error for a matching curve 350 is actually normalized to a world coordinate system 230. This world coordinate system 230 defines depth information in a "universal" world coordinate system 230 utilized across all of the 2D views 240, 250, 260. Therefore, for example, a local minimum in a matching curve specified for a pixel of a first view can be directly compared to a local minimum in a matching curve specified for a pixel of a second view. Where these local minima generally overlap, viewed from across different views, there is a high probability of detection of a true voxel and consistent determination of depth information for corresponded pixels.

Figure 3:
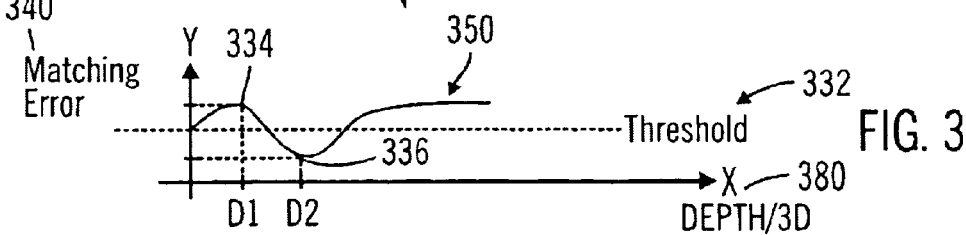
FIG. 3 is a graph showing the exemplary matching curve of FIG. 2.

Additionally, as shown in FIG. 3, a threshold 332 can be reasonably set to facilitate analyzing a matching curve 350. Points on the matching curve that are above the threshold 332, i.e., that have a high matching error, can be considered unlikely of being a true voxel. Points on the matching curve 350 that are below the threshold 332 may be considered candidates for identifying a true voxel for a particular pixel P1 242. In this example, the matching error at a first point 334 on the matching curve 350 (at the first depth D1 244) is shown above the threshold 332 while the matching error at a second point 336 on the matching curve 350 (at the second depth D2 246) is shown below the threshold 332. The matching curve 350, in this example, illustrates a local minimum about the second point 336 where the second depth D2 246 has been corresponded across the different views. This local minimum about the second point 336 tends to indicate that for the pixel P1 242 a true voxel position for an object located in the scene being viewed may be located in the scene at a depth that is approximately the depth indicated for the second depth position D2 246 in the world coordinate system 230.

In this way, repeating the process discussed above for all of the pixels in the first view 240 (i.e., as a reference view), a collection of matching curves can be created for the pixels of the first view 240. This process can then be repeated for the second view 250, i.e., with the second view 250 being set to the reference view, to create a collection of matching curves for the pixels of the second view 250. Further, this process can be repeated for the third view 260, with the third view 260 being set as a reference view, to create a collection of matching curves for the pixels of the third view 260. As can be appreciated, a collection of matching curves would be defined for the respective pixels for each of the 2D views 240, 250, 260, that are viewing the 3D scene. Once matching curves are available for the pixels of the various views 240, 250, 260, a preferred method according to the present invention analyzes the attributes and characteristics of matching curves for the pixels of the various 2D views to reconstruct 3D information (i.e., grow volumes) for objects of the 3D scene being viewed by the various 2D views, as will be discuss in more detail below.

FIGS. 4A and 4B illustrate ideal matching curves, and FIG. 4C illustrates a matching curve with false matches. The matching curves in FIGS. 4A, 4B, and 4C, are shown under different scenarios for determining depth information at a particular pixel. In FIG. 4A, the location of a true voxel 202 is shown where the matching error is high except at a location of a true voxel 202 where the matching error is equal to zero. This is an ideal condition indicating the precise depth information at a particular pixel. In FIG. 4B, a plurality of true voxel candidates 212, 213, 215, and 217, are shown for a plurality of depths for a particular pixel. Note that the first true voxel 213 is located at a first minimum position on the matching curve, traversing the matching curve from left to right. A preferred search method would start searching from a depth of zero (at the left-most point) and then search by increasing depth (along the X-axis) and arriving at the first true voxel candidate 213.

As can be seen in FIG. 4B, there are other potential candidate true voxels, such as at a second depth 212, at a third depth 215, and at a fourth depth 217. According to a preferred search method, each candidate of the sequence of true voxel candidates 212, 213, 215, and 217, is analyzed in sequence until a determination of a correct true voxel is made for the particular pixel associated with the matching curve, as will be discussed below.

In FIG. 4C, there are shown false matches 224, 226, for candidate voxels besides the additional candidate true voxels 222, 225. In this example, besides the true voxel candidates 222, 225, there are false matches 224, 226, due to incorrect correspondence with pixels of other views. A conventional implementation, unfortunately, would have analyzed a single matching curve and thereby would likely have detected the false match 224 depth for a candidate voxel and consequently would have failed to detect the true voxel depth, such as the first true voxel 222. This would have resulted in significant gross errors in reconstruction of 3D information for a scene. On the other hand, even with the presence of false matches 224, 226, a preferred method according to the present invention advantageously analyzes a plurality of matching curves for corresponding pixels of a plurality of views. When a plurality of the matching curves (from the corresponded pixels of the different views) overlap error regions at about a specific depth this indicates a statistically likely location for a true voxel. This approach will generally avoid false matches and further will more reliably and robustly determine the depth location of a true voxel for reconstructing 3D information from a plurality of 2D views. This is a significant advantage of the present invention.

Figure 5A:
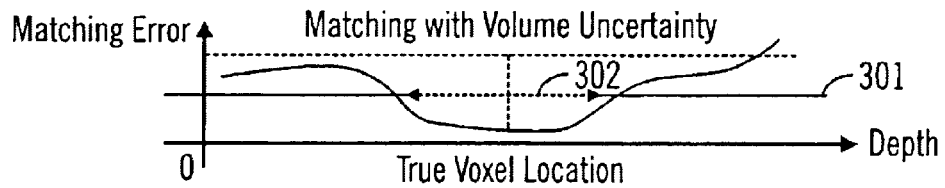
FIGS. 5A, 5B, and 5C, show three graphs of exemplary matching curves with depth volume uncertainty.
Figure 5B:
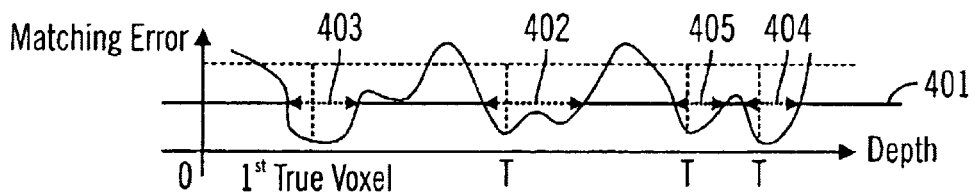
Figure 5C:
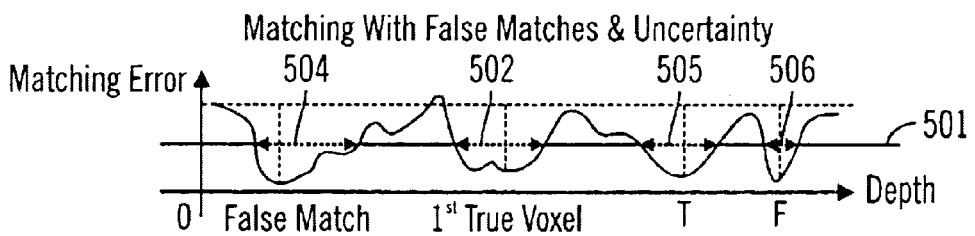

Although ideal matching curves, as discussed above, appear to readily provide candidates for true voxels, real world implementations include significant volume uncertainty making it much more difficult to determine a depth of true voxel candidates. This volume uncertainty complicates a method for consistently detecting depth for a true voxel. For example, referring to FIGS. 5A, 5B, and 5C, three matching curves are illustrated with additional volume uncertainty. Unlike the matching curve scenarios discussed with respect to FIGS. 4A, 4B, and 4C, a more realistic representation of matching curve scenarios is shown in FIGS. 5A, 5B, and 5C, where volume uncertainty, such as the uncertainty 302, 402, 403, 405,407, 502, 504, 505, and 506, is commonly included in matching curve calculations for determining a likely depth information for a voxel. For comparison, see the dotted lines in the FIGS. 5A, 5B, and 5C, representing the curves previously shown in FIGS. 4A, 4B, and 4C. A preferred method according to the present invention, utilizes a threshold 301, 401, and 501, to help identify error regions for depth information of a candidate voxel indicated by local minima or a global minimum. Within the error region of one of the local minima or a global minimum likely can be found a true voxel. By analyzing a single matching curve associated with a particular pixel it would be very difficult, if at all possible, to identify a true voxel with 3D depth information associated with an outer surface of a volume of an object in a scene being viewed. However, by analyzing a plurality of matching curves for corresponded pixels across a plurality of 2D views, overlapping regions between local minima or a global minimum of the matching curves will identify a likely true voxel for an object in a scene. The depth information will be indicated by the overlap regions of the plurality of matching curves. This results in a reliable and robust method for extracting 3D information from a plurality of 2D views of a 3D scene.

Figure 6A:
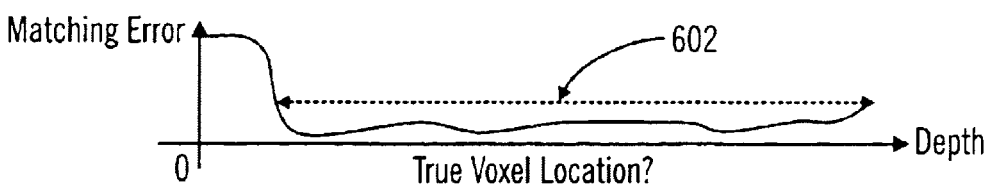
FIGS. 6A and 6B show two graphs of exemplary matching curves with extreme depth volume uncertainty.
Figure 6B:
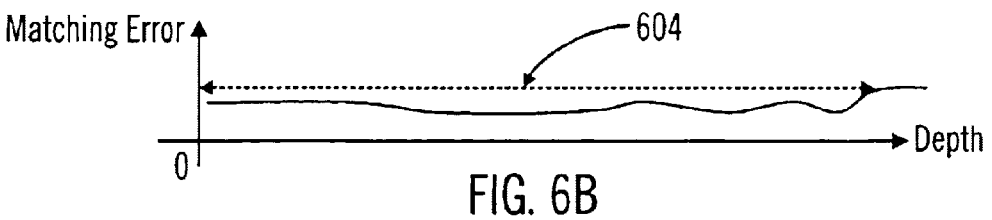

In certain scenarios, unfortunately, certain matching curves may not reliably indicate local minima or a global minimum. An analysis of a single matching curve for a pixel of a 2D view, as has been done in the past, will yield a large gross error in estimating a depth information to determine a voxel location. For example, as illustrated in FIGS. 6A and 6B, the matching error regions 602, 604, can extend to a very large number of potential voxel locations thereby resulting in a high uncertainty as to the true depth information associated with a candidate voxel for a pixel. In particular, note that in FIG. 6B, certain matching curve characteristics may not yield a local minimum or a global minimum to be able to estimate depth information. This is a significant drawback of prior art implementations which utilize a single matching curve to determine depth information and thereby can result in very large gross errors in reconstructing 3D information for a scene. A preferred embodiment of the present invention, as will be discussed in more detail below, significantly improves the reliability and robustness of extracting 3D information from a plurality of 2D views by analyzing overlap regions of local minima or a global minimum across the plurality of views. When a particular 2D view's matching curve has too much volume uncertainty, such as illustrated in the matching curve regions 602, 604, shown in FIGS. 6A and 6B, a preferred method according to the present invention will not necessarily be defeated because it utilizes a plurality of matching curves for a plurality of views to determine the overlap regions of local minima or global minimum. Additionally, a matching curve with very high volume uncertainty, such as illustrated in the matching curve regions 602, 604, will likely be identified and marked as an occluded view. An occluded view will be avoided in a determination of depth information for a voxel candidate. Additionally, as will be discussed in more detail below, those pixels that do not directly yield a likely voxel will still be computed for depth information by propagating likely depth information from neighboring pixels that have been more reliably determined to be true voxels (or confident seeds to propagate depth information therefrom). This is a main advantage of the present invention that is not found in any known prior art.

Figure 7:
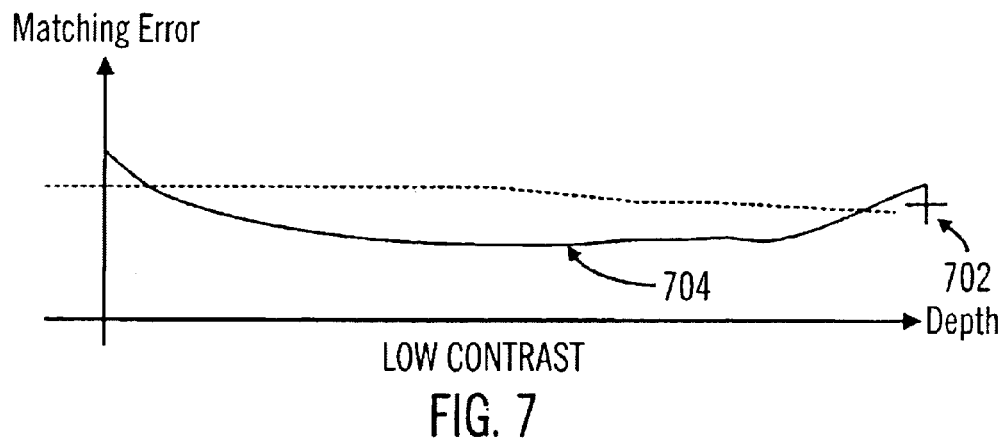
FIG. 7 shows a graph of an exemplary matching curve for a typical low contrast region.
Figure 8:
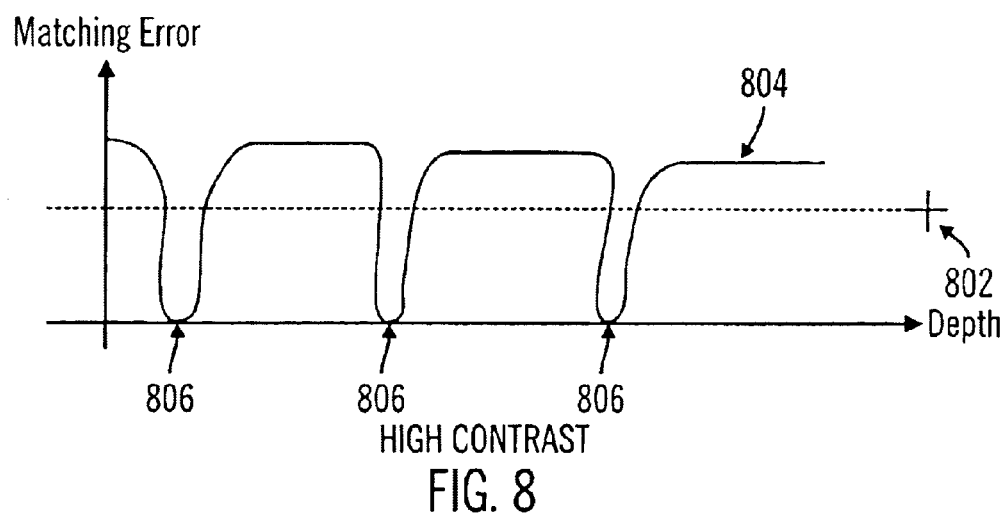
FIG. 8 shows a graph of an exemplary matching curve for a typical high contrast region.

With reference to FIGS. 7 and 8, the present discussion will now turn to a review of certain attributes of matching curves that are important for reliably reconstructing 3D information from a scene being viewed by a plurality of 2D views. Color homogeneity in a scene produces matching curves with broader envelopes for a local/global minimum region. See, for example, the matching curve 704 shown in FIG. 7. The envelope is the distance between the first time a matching error is lower than a predefined threshold 702 and the first time a matching error is higher than the predefined threshold 702. When the envelope of a local/global minimum is wide, such as illustrated in FIG. 7, the determined depth can fall into many different 3D depth locations within the envelope. This causes irregularity in a recovered 3D structure even when the 3D depth locations are correctly identified to be within an error region (with a wide envelope) out of the many error regions. In other words, a 3D reconstruction process creates structural noise in determining a depth value for a voxel. This error depth information for recovered 3D information for a pixel would then be conformed (propagated) to neighboring pixels to generally create a patch. But, the patch, unfortunately, will not be a consistent depth with other neighboring patches to attempt to create a continuous surface of a volume of an object in a scene. The irregularity of the depth information between patches, unfortunately, alters the reality of the 3D structure in the scene. This is especially noticeable at regions with homogeneous color and low contrast. Low contrast and homogeneous color regions in 2D images typically exhibit very low frequency in matching curves 704, such as that shown in FIG. 7. This low frequency matching curve 704 is a phenomena resulting from homogeneous color and low contrast regions in an image, such as when looking at a sky view or looking at an ocean view in a scene. It often is very difficult to extract 3D information for specific pixels under such scenarios with low frequency and low contrast regions.

High contrast regions, on the other hand, can be much more easily analyzed to determine correct 3D depth information associated with a pixel. High contrast regions typically are found about edges between objects in a scene. The high contrast from pixel to pixel in a view typically results in high frequency matching curves, such as the matching curve 804 illustrated in FIG. 8. The narrow envelope of the matching curve local minima 806 (i.e., those portions of the matching curve 804 lying below a predefined threshold 802) increases the accuracy of determining the correct depth information for a pixel associated with the matching curve. A preferred method according to the present invention can more readily identify the appropriate error region (from a plurality of error regions) that corresponds to a true voxel. That is, in a high contrast region of a scene, the 3D information doesn't vary very far between the different views of the same matching pixel. It is much more reliable to detect the overlapping error regions between the various views of the scene about a high contrast region, such as about an edge between objects in a scene.

A preferred method according to the present invention makes best use of attributes of, and other information from, matching curves to smooth out the structural irregularity after the 3D data has been derived from the matching curves. The assumption is that the depths are correctly determined within their respective local minima. A preferred method, according to the present invention, utilizes the following procedure.

1). Perform searching and matching concurrently for each pixel in every view.

2). Record matching curves' attributes concurrently for each pixel in every view during the searching and matching process. Each pixel is associated with at least one matching curve, such as a matching curve of a color match and/or a matching curve of a color-edge match.

3). Use matching curves characteristics of multiple 2D views to locate confident seeds for affecting the results of their neighboring pixels and their non-occluded corresponding pixels.

4). Use matching curve characteristics of multiple views to propagate good matches along the edgels in a reference view and in its non-occluded corresponding views. Every view itself is a reference view; the other views with pixels being corresponded to the pixels of the reference view are corresponding views. Additionally, assign the recovered 3D, which are considered confident in the matching process (e.g., at the edgels), as reference data. These reference data are used for 3D smoothing at Steps 6 and 7, and their values won't be altered. They act like the supporting structures for the homogeneous regions.

5). Use matching curve characteristics of multiple views to propagate good matches from the edge portions into the homogenous regions of a reference view and its non-occluded corresponding views.

6). Iteratively apply to each and every non-occluded corresponding pixel in a reference view a fixed window size with the subject pixel located at the center of the window, and then calculate an average depth value for the neighboring pixels covered by the window. Note that the neighboring pixel's 3D depth information should be within the error region of the subject pixel in the reference view to ensure that a surface continuity constraint is met. Additionally, the average calculated depth should be bounded within an error region of the subject pixel and its non-occluded corresponding pixels (in the corresponding views) to ensure that the 3D consistency requirement across the corresponding views is also met.

7). If the calculated average depth is more than a predefined smoothing threshold range for any of the subject pixels in the reference view image, then replace each of the subject pixels' depth with the new respective calculated average depth, and also replace the respective non-occluded corresponding pixels' depth with the new calculated average depth, and then repeat steps 6 and 7 again. Alternatively, if the calculated average depth is within the predefined smoothing threshold range for all of the subject pixels in the reference view, then the smoothing process can stop for this reference view image. Note that, according to a preferred embodiment of the present invention, all of the reference view pixels are simultaneously processed according to iterative smoothing process steps 6 and 7. At each iteration of process steps 6 and 7 the preferred method compares the calculated average depth for each and every subject pixel in the reference view with a predefined threshold range. This threshold range is preferably set to stop the iterations of the smoothing process in an operational sequence of an image processing system when the change in average depth information for each and every subject pixel is small enough to be acceptable for representing smooth surfaces. The resulting 3D images will be more visually pleasant to a user.

In step 6, a neighboring pixel's depth is counted towards the depth averaging process only when it's depth is bounded by the envelope of the subject pixel's error region where the subject pixel's depth lies within. A subject pixel is at the center of the rectangular window. The window size is preferably selected to have a multiple of odd numbers such as 7×7. A subject pixel's depth cannot be altered if the pixel has an assigned 3D depth in step 4. By doing the averaging process in steps 6 and 7, iteratively, the depth will eventually settle for neighboring pixels at depth values confined by the reference 3D depth data assigned in step 4. Yet, the subject pixels' depths will never be replaced with a depth value that is outside of any of: 1) the bound of the subject pixels' error region, and 2) the bound of the non-occluded corresponding pixels' error regions. The averaging process discussed above, while remaining within the bound of the referenced depth matching curve, significantly increases the reliability of the propagated depth value for the neighboring pixels. Lastly, when a larger window size is used, the convergence is approached faster; however, the detailed surfaces of a volume may not be as smooth. An example of a windowing implementation will be discussed in more detail below.

Figure 9:
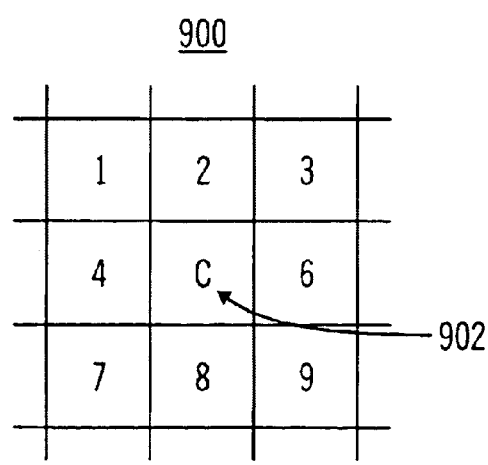
FIG. 9 shows an exemplary window grid for tracking neighboring pixels in an image view, in accordance with a preferred embodiment of the present invention.

Referring to FIG. 9, a window (i.e., represented by a grid of neighboring pixels) is defined about a particular pixel in an image. The particular pixel being analyzed is located at the center pixel 902 of this grid. The center pixel 902 is indicated by the letter C. Preferably the window grid is arranged in an odd number of pixel rows and columns about the center pixel, which is the pixel of interest being analyzed and potentially propagated to its neighboring pixels.

The neighboring pixels, being indicated by the numbers 1, 2, 3, 4, 6, 7, and 9, in the exemplary grid shown in FIG. 9, are each contemporaneously calculated for depth information from its respective matching curve. The neighboring pixel has to have the same 3D center point depth information associated in the matching curve as the center point pixel, or else the smoothing algorithm does not use the neighbor for the present averaging function. The depth information for the center pixel is continuously averaged within the window (the grid including all neighboring pixels). In this way, the low contrast regions with potentially widely differing depth information being picked up for neighboring pixels will typically result in an average depth that is consistent and reliable across the entire homogeneous region. This helps to reduce uncertainty in reconstructing 3D information for such homogeneous regions by reducing the variability of depth calculated from pixel-to-pixel. Typically, as has been discussed above, these homogeneous regions suffer from large variability of depth calculations between neighboring pixels. This appears as structure noise in an image. The volume of uncertainty for pixels in a homogeneous region is very large. Homogeneous regions include portions of an image that are not textured and with generally constant color. By averaging the depth information, as discussed above, and propagating this averaged depth information from confident reference 3D data for subject pixels to their neighboring pixels results in a more visually pleasing display of a 3D image.

A preferred method, according to the present invention, initially identifies confident seed pixels associated with reliable depth information and then grows surfaces of a volume of an object in a scene from these confident seeds. Preferably, the method locates the confident pixels about the edge portion of an object in a scene, because the edge portion is normally a high contrast area with very low variability in depth calculation. The preferred method then operates to smooth surfaces by averaging depths of neighboring pixels, as discussed above, while basing the averaging on a consistent determination of depth from confident seed pixels. The preferred method propagates depth information from the pixels about the edges inward through homogeneous regions of surfaces of a volume of an object in the scene. This process advantageously smoothes out the variability across the homogeneous surfaces resulting in a visually pleasing display of 3D image information.

As the depth of a particular pixel is determined, a preferred method, in accordance with the present invention, grows and propagates depth information to a subsequent voxel at another neighboring pixel position in the image. The method iteratively applies the averaging process discussed above while moving the window grid 900 over neighboring pixel positions to average depth information. The method thereby determines the depth information of neighboring pixels and accordingly grows the surface of a volume of an object in the scene. After applying the averaging process to neighboring pixels across the homogeneous region of objects in a scene, the resulting 3D image is now more visually pleasing to display to a user of an image processing system. A remaining step is to render and display 3D image information to a user. The 3D display of the processed image will result in a more reliable determination of 3D image information for a scene. Additionally, the averaging process discussed above can be applied to the 3D data information to smooth out the variability of pixel depth across homogeneous regions resulting in a more visually pleasing 3D image being displayed to a user. This is a significant advantage of the present invention not available in any known prior art.

EXEMPLARY SYSTEM IMPLEMENTATION

Figure 10:
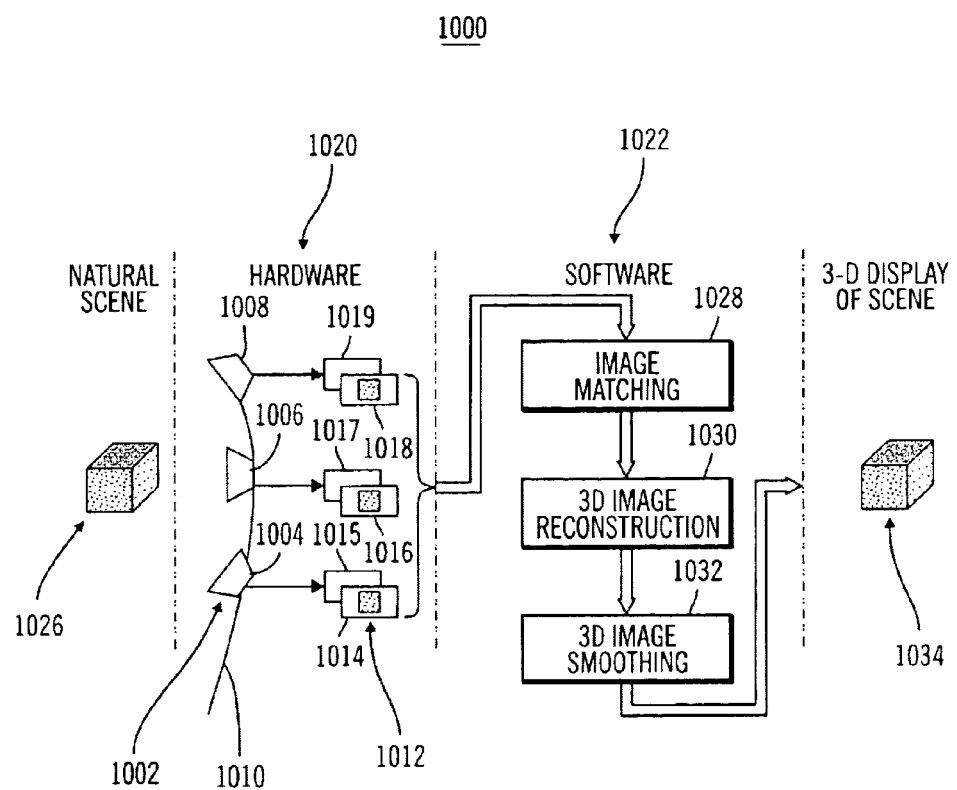
FIG. 10 is a block diagram of an exemplary image processing system, according to a preferred embodiment of the present invention.

According to a preferred embodiment of the present invention, as shown in FIG. 10, an exemplary 3-D image processing system 1000 comprises a set of digital (still or video) cameras 1002, three cameras 1004, 1006, 1008, being shown, which are arranged with different poses and are electronically synchronized such as via an electrical signal bus 1010. At any time instant, the cameras 1002 generate a set of images 1012, such as three images 1014, 1016, 1018, being shown for the three respective digital capture interfaces 1015, 1017, 1019, for the three cameras 1004, 1006, 1008. Each of the set of images 1012 deviates from the other images in the set of images 1012 by camera relative motion. However, the cameras 1002 are in known locations within a "universal" world coordinate system that includes all objects in a scene 1026 being viewed by the cameras 1002. For example, the first image 1014 and the second image 1016 can deviate from one another by a distance between corresponding feature points found on both images 1014, 1016, due to the different poses of the cameras 1004, 1006, relative to a scene 1026. This camera relative motion between the two images 1014, 1016, can be represented by a motion vector between feature points that correspond (i.e., that match) between the two images 1014, 1016. Additionally, although still cameras 1004, 1006, 1008, and a still scene 1026 are shown in this example, it should become obvious to one of ordinary skill in the art in view of the teachings herein that any combination of still and/or moving scene 1026 and/or cameras 1004, 1006,1008, can be represented in accordance with alternative embodiments of the present invention. For example, a moving object scene 1026 and utilizing still cameras 1004, 1006, 1008, may be perfectly desirable for certain applications of the present invention. Therefore, the term camera relative motion, as used herein, is intended to broadly cover all such alternative embodiments of the present invention wherein any combination of still and/or moving scene 1026 and/or cameras 1004,1006, 1008, can be represented.

The three respective digital capture interfaces 1015, 1017, 1019, are communicatively coupled to a computer system (not shown in FIG. 10). The set of images 1012 is then processed by the hardware 1020, the computer system (not shown), and the software 1022 of the system 1000 to output reconstructed 3D image information 1034 of the scene 1026 observed by the set of cameras 1002. The software 1022 preferably comprises a pixel matching module 1028 for matching pixels across multiple views 1014, 1016, 1018, of the scene 1026. This image matching module 1028 provides matching curves for the respective pixels in each of the 1014, 1016, 1018, as has been discussed above. The 3D image reconstruction module 1030 analyzes the matching curves, including matching curve attributes and characteristics, to provide the seed points for further processing to extract the 3D depth information for surfaces of volumes of objects in the scene 1026. The 3D image reconstruction module 1030, as will be discussed in more detail below, provides additional processing of the image information after the image feature points have been detected and matched across views 1014, 1016, 1018. The matching curves of the pixels in the views 1014, 1016, 1018, are then analyzed to reconstruct 3D image of the scene 1034. Additionally, a 3D image smoothing module 1032 operates on the reconstructed 3D image data to smooth out irregularities in surfaces of volumes of objects in the scene 1026. This 3D image smoothing module 1032 significantly enhances the 3D image information that would be displayed (such as via a display) to a user of the system 1000.

Figure 11:
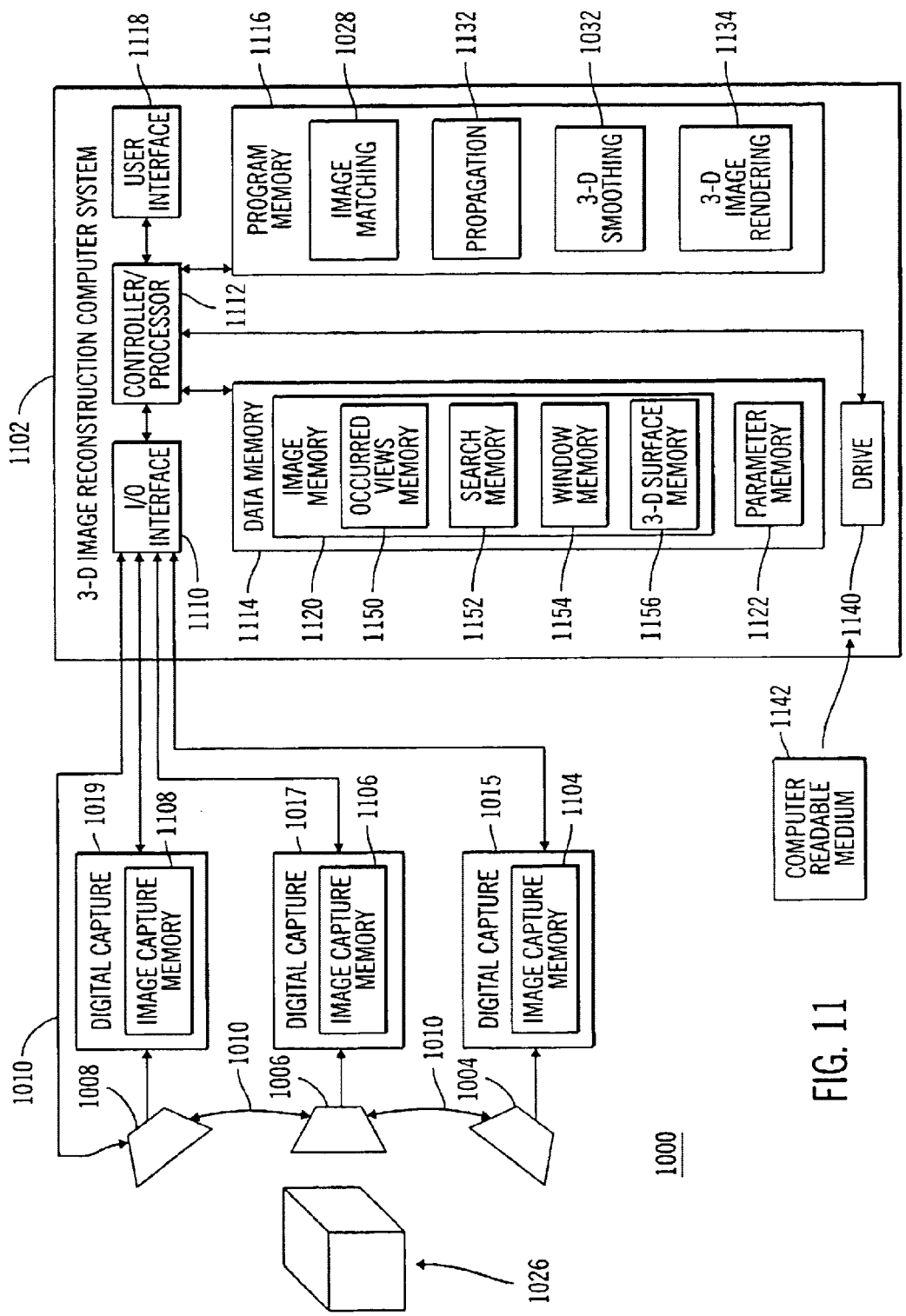
FIG. 11 is a functional block diagram illustrating a more detailed view of the exemplary image processing system of FIG. 10, according to a preferred embodiment of the present invention.

FIG. 11 illustrates a more detailed view of the 3D image processing system 1000 of FIG. 10, according to a preferred embodiment of the present invention. Each of the digital capture interfaces 1015, 1017, 1019, includes respective image capture memory 1104, 1106, 1108, for storing a captured image 1014, 1016, 1018. The digital capture interfaces 1015, 1017, 1019, are communicatively coupled to an input/output interface 1110 of a 3D image reconstruction computer system 1102. Additionally, the electrical signal bus 1010 is communicatively coupled to the input/output interface 1110. The 3D image reconstruction computer system 1102 comprises a controller/processor 1112 that is electrically coupled to data memory 1114 and to program memory 1116. The controller/processor 1112 is also electrically coupled to a user interface 1118 that presents information to a user, such as via a monitor display (not shown), and receives user input from the user such as via a keyboard (not shown) and a mouse (not shown).

The data memory 1114 includes an image memory 1120 for storing image information. The image memory 1120 comprises data structures for a occluded views memory 1150 to keep track of those pixels that have high likelihood of being erroneous image information, a search memory 1152 to keep track of confident seed pixels located in the images of the scene, a Window grid memory 1154 to keep track of windows surrounding pixels being analyzed for propagating depth surface averaged across neighboring pixels, and a 3D surface memory 1156 that keeps track of the propagated pieces of depth surface over volumes of objects in the scene. These data structures are used by the 3D image reconstruction functional module 1030 and the 3D image smoothing module 1032, as will be discussed in more detail below. Additionally, the data memory 1114 includes a parameter memory 1122 where the 3D image reconstruction computer system 1102 stores configuration parameters for the 3D image processing system 1000.

The program memory 1116 provides computer program instructions for the controller/processor 1112 for performing operational sequences for the 3D image processing system 1000, according to the preferred embodiments of the present invention. The program memory 1116 includes four functional modules. The four functional modules are as follows: an image matching module 1028, a propagation module 1132 for computing the 3D propagation of depth for surfaces in a scene, a 3-smoothing module for smoothing irregularities from 3D information of neighboring pixels of surfaces of volumes of objects in a scene, and a 3D image rendering module for displaying 3D image information. Operations of the four functional modules will be discussed in more detail below with respect to an exemplary system.

Additionally, the 3D image reconstruction computer system 1102 preferably includes a drive 1140 for receiving the computer readable medium 1142. This provides a means of transferring information with the 3D image reconstruction computer system 1102. For example, computer programs (and updates thereto) can be provided to the 3D image reconstruction computer system 1102 and stored in the program memory 1116 via the computer readable medium 1142 in a manner well known to those of ordinary skill in the art. Additionally, image information and related parameters can be transferred between the computer readable medium 1142 and the data memory 1114.

According to a preferred embodiment of the present invention, the image matching module 1028 operates in the 3-D image reconstruction computer system 1102 and is stored in the program memory 1116. The image matching module 1028, according to one embodiment of the present invention, operates on image information (e.g., matching curves) that indicates the correspondence of image information across a plurality of images representative of a scene. The 3D image reconstruction module 1030 analyzes image information that corresponds across the plurality of views to provide image features (such as pixels) as confident seeds for the 3D image reconstruction computer system 1102 to reconstruct the 3D image depth information as discussed above, according to the present invention. The 3D image smoothing module 1032 performs the averaging process to reduce irregularities between reconstructed 3D depth information of surfaces of columns of objects in a scene being viewed.

According to a preferred embodiment of the present invention, significant portions of the 3D image processing system 1000 may be implemented in integrated circuits. For example, functional components of the 3D image reconstruction computer system 1102 may be implemented in at least one integrated circuit. Similarly, significant portions of the digital capture modules 1015, 1017, 1019, can be implemented in at least one integrated circuit.

According to alternative embodiments of the present invention, the 3D image processing system 1000 may be implemented, for example, in devices such as three-dimensional scanners, facsimile machines, video communication equipment, and video processing equipment.

Figure 12:
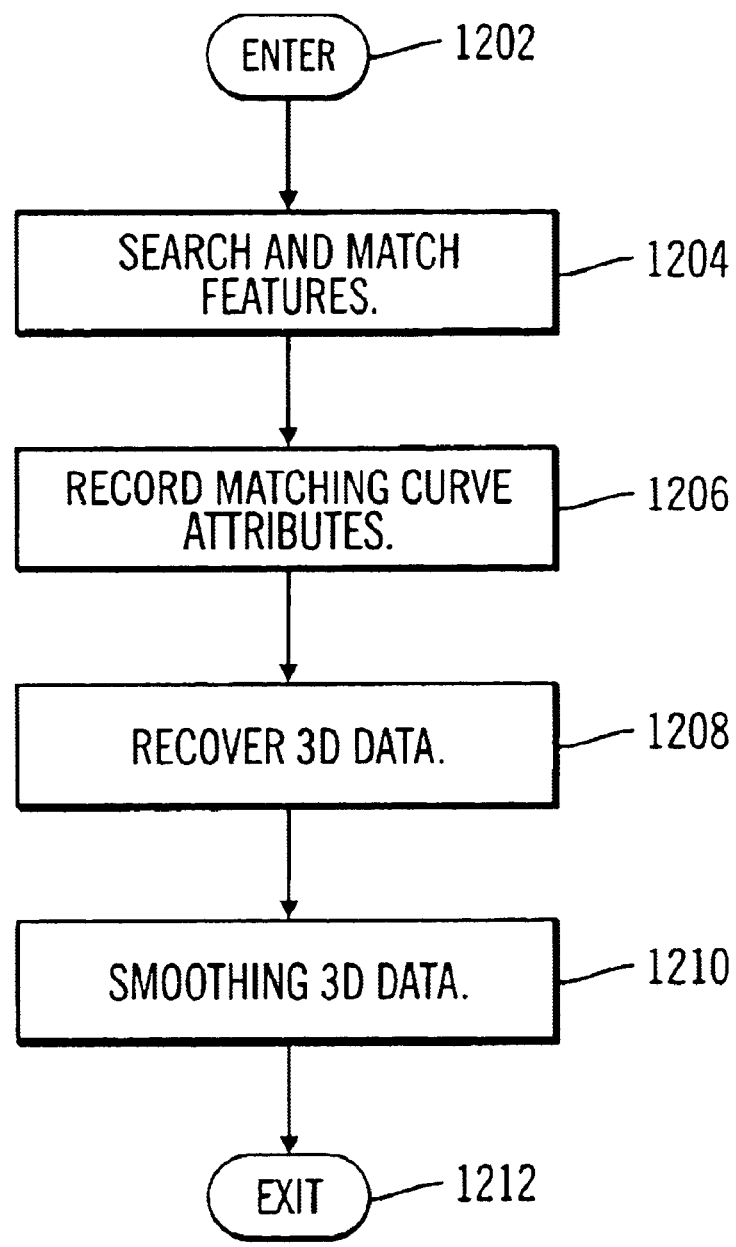
FIGS. 12, 13, and 14, are operational flow diagrams illustrating an exemplary operational sequence for the exemplary image processing system of FIGS. 10 and 11, according to a preferred embodiment of the present invention.
Figure 13:
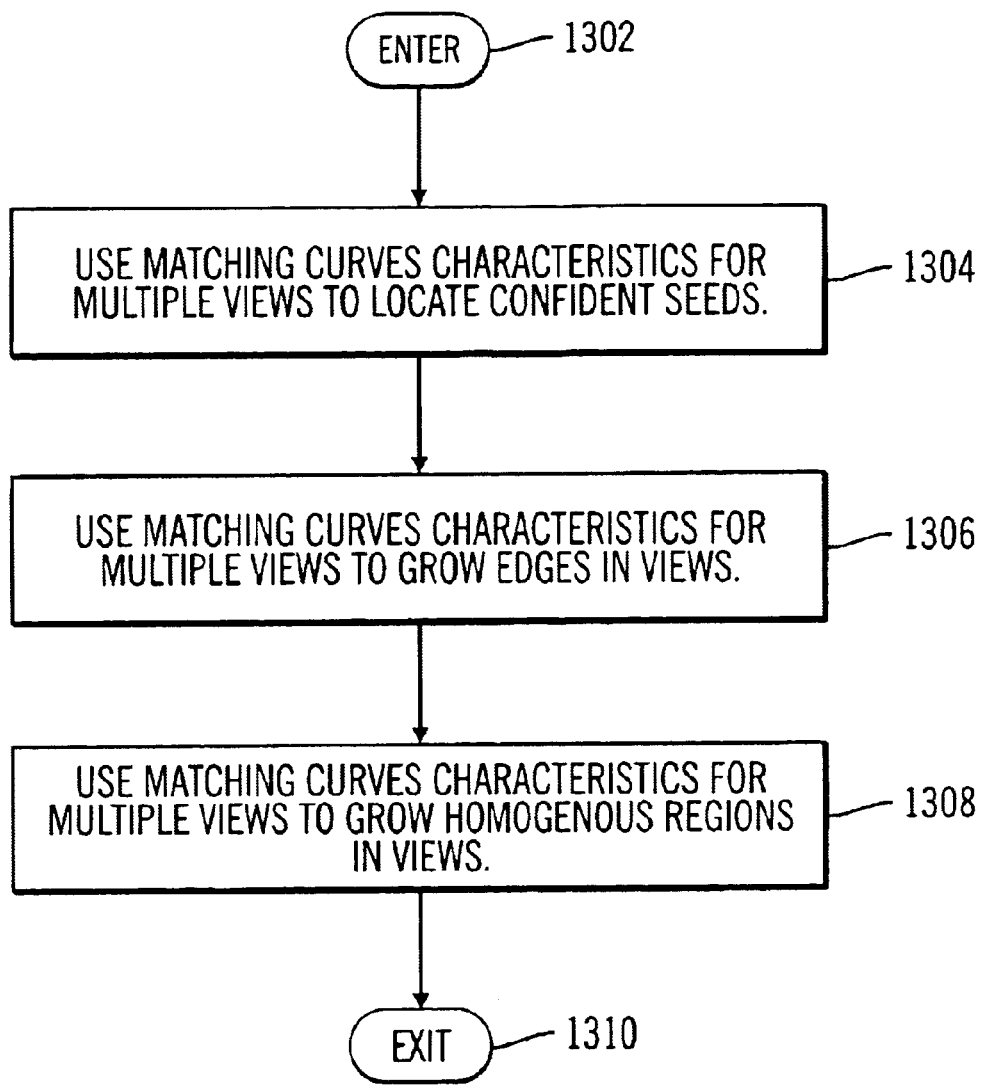
Figure 14:
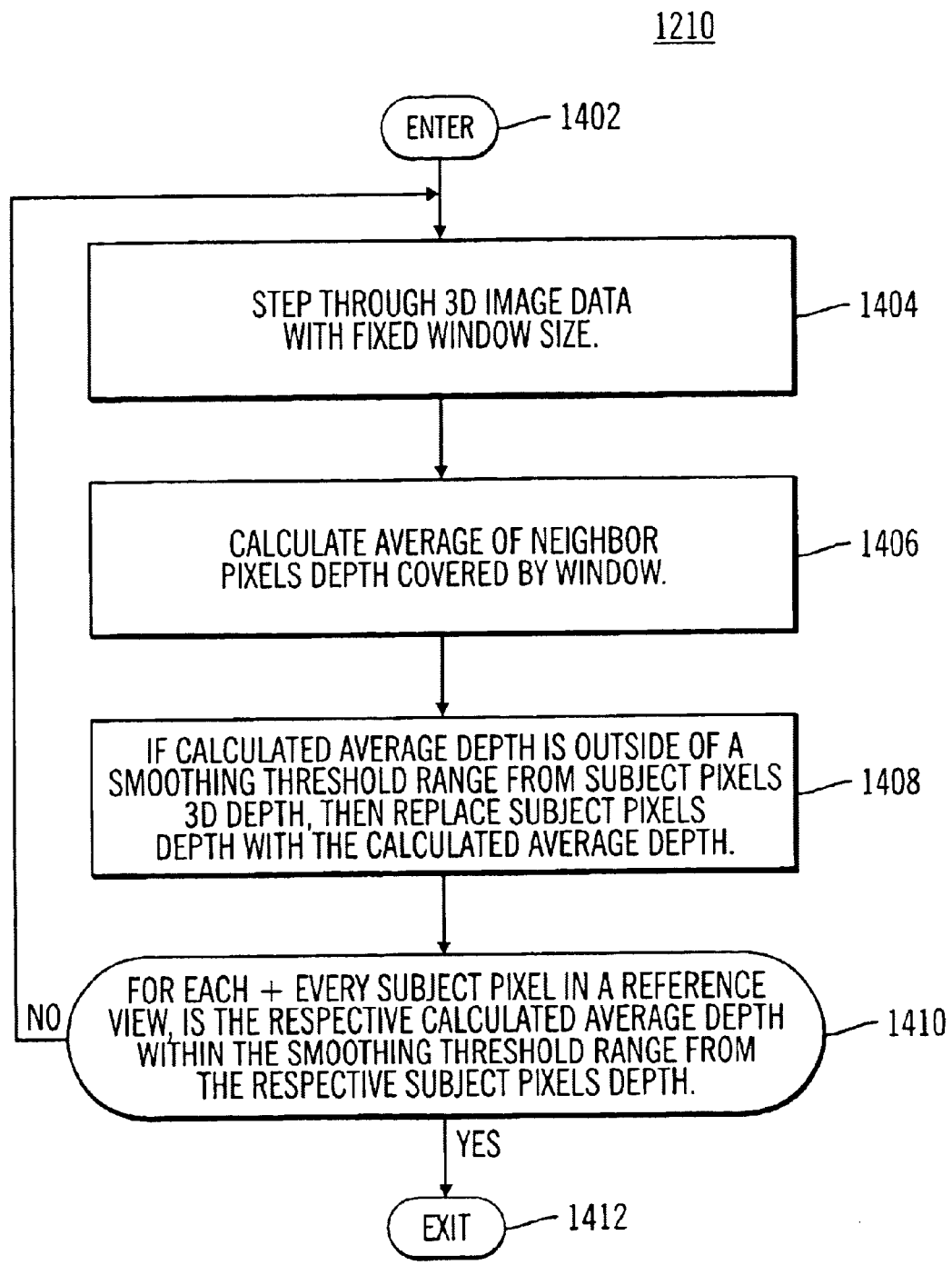

FIGS. 12, 13 and 14 illustrate a preferred operation sequence for the image processing system 1000 illustrated in FIGS. 10 and 11, according to a preferred embodiment of the present invention. FIG. 12 illustrates the overall operational sequence, while FIG. 13 illustrates a more detailed view of the recovering 3D data 1208 operational sequence and FIG. 14 illustrates a more detailed view of the smoothing 3D data 1210 operational sequence. The recovering 3D data operational sequence 1208 illustrates a preferred implementation. However, other alternative operational sequences for recovering 3D data may be used in an image processing system 1000 as may be obvious to those of ordinary skill in the art in view of the present discussion. Further, the smoothing 3D data operational sequence 1210 illustrates a preferred implementation in accordance with the teachings of the present invention. However, the smoothing 3D data operational sequence 1210 is optional and may not exist in all system implementations of image processing systems 1000. However, it provides significant advantages to recovered 3D data resulting in a more visually pleasing 3D image display for users of image processing systems 1000, which is a significant advantage of the present invention that is not found in any known prior art systems.

Referring to FIG. 12, the operational sequence is entered at step 1202. The 3D image reconstruction computer system 1102 searches and matches features across multiple 2D views of a scene, at step 1204.

With respect to step 1204, the search and match feature's operational sequence may include, for example, a method such as a scan line approach or a virtual ray approach for searching and matching corresponding pixels across the multiple views, as should be obvious to those of ordinary skill in the art in view of the present discussion. In the scan line approach, for example, all pixels across the scan line are compared and matched to recover depth for a particular pixel being analyzed and corresponded. This can be very inefficient because all pixels are compared for determining correspondence. A second approach is the virtual ray approach which analyzes only the those pixels that are visible in a virtual ray being recovered. The second approach can be much more efficient than the scan line approach. Additionally, the operational sequence, at step 1204, may use another alternative search and match method, as would be known to those of ordinary skill in the art, that can provide a matching curve indicative of the probability of error in determining a depth for a pixel in a 2D view of a 3D scene being viewed by multiple 2D views.

The matching of features, e.g. pixels, across multiple views is handled by any of the known methods of matching features across multiple views and that result in a matching curve description for each feature, e.g., pixel, which is then stored in the search memory 1152. Note that a matching curve can be expressed in many different ways and then preferably stored in memory. For example, a matching curve can be expressed in memory as a table, a database, and an equation with parameters, or by other means which should be obvious to those of ordinary skill in the art in view of the present discussion.

An important feature of a matching curve is that it can be interpreted to define a likelihood of a certain depth being matched for a particular feature, e.g., pixel, in an image view. This likelihood of a depth value for 3D reconstruction can also be expressed as a probability of error in selecting a particular depth value. Next, at step 1206, the system 1102 records the matching curve attributes for each feature, e.g., pixel, in a view. Then, at step 1208, the system 1102 operates to recover 3D data from the multiple views utilizing a preferred 3D reconstruction method. One preferred such method will be discussed with reference to FIG. 13. Next, the system 1102 may optionally operate a smoothing 3D data method, at step 1210, to significantly improve the visual presentation of 3D data to a user. This optional smoothing 3D data process will be discussed with reference to FIG. 14. Finally, the system exits the operational sequence at step 1212.

Referring to FIG. 13, a preferred operational sequence for recovering 3D data 1208 is entered, at step 1302, and then, at step 1304, the system 1102 uses the matching curve characteristics for multiple views to grow edges of objects in the multiple views, at step 1306. Here the system 1102 finds the confident seeds by locating the characteristic-pair (one local maximum vs. one local minimum) across the multiple views to determine the confident seed which has the local minimum across the most views. The system 1102 preferably finds the confident seeds across the multiple views by determining each confident seed that has s overlapping across a plurality of corresponding image features in the plurality of views. These confident seeds are then propagated to their neighbor pixels as long as the seed voxel is determined to be within the neighbor's volume of uncertainty in order to be propagated to the neighboring pixel (or to their respective projected view). That is, the subject pixel's volume of uncertainty (or error region) must coincide with the seed voxel local minimum location to be able to propagate the seed voxel to it's neighbor. The edgels of objects are easier to detect because of the high contrast at the edges as discussed previously with reference to FIG. 8. Note that those pixels that have very high probability of error relative to the local minimum across the multiple views are determined to be occluded views and their reference is stored in memory 1150. In this way, the system 1102 keeps track of occluded views and keeps these from the calculations to propagate the seed voxels to their neighbors. Once the edges are defined, at step 1306, the system 1102 then proceeds, at step 1308, to grow the homogeneous regions in the multiple views. The characteristics of the matching curves for the multiple views are used here again to find the seed voxels by matching the characteristic pair of local minima across the multiple views and then to grow the seed voxels to their neighboring pixels that have the seed voxel depth located within the neighboring pixels volume of uncertainty in order to propagate the seed voxel to the respective neighbor pixel. The volume of uncertainty is also known as the error region. Lastly, at step 1310, the system 1102 exits the 3D reconstruction operational sequence.

Referring to FIG. 14, the optional 3D smoothing operational sequence 1210 is entered, at step 1402. The operational sequence 1210, according to a preferred embodiment of the present invention, iteratively steps through recalculation of an average 3D depth for each and every subject pixel's 3D depth information, at steps 1404, 1406, 1408, and 1410, until all of the pixels in each view have been processed to meet a predefined smoothing threshold range. As previously discussed above, when a calculated average depth is within the predefined smoothing threshold range for all of the subject pixels in the reference view being processed for smoothing, the operational sequence then exits, at step 1412.

While stepping through the 3D depth information of each and every pixel of a reference view, at step 1404, the computer system 1102 normally utilizes a fixed window size about each and every subject pixel in the reference view, such as that illustrated and discussed with respect to FIG. 9. Preferably, the system 1102 simultaneously processes each and every pixel of the reference view at each iteration step. At step 1406, the system 1102 calculates the average depth of all non-occluded neighbor pixels (other than the subject pixel) being covered by the window. However, the average depth is only calculated from those neighbors that have their depth lying within the subject pixel's volume of uncertainty (or error region) of their respective matching curve. Note that the neighboring pixel's 3D depth information should be within the error region of the subject pixel in the reference view to ensure that a surface continuity constraint is met. Additionally, the average calculated depth should be bounded within an error region of the subject pixel and its non-occluded corresponding pixels (in the corresponding views) to ensure that the 3D consistency requirement across the corresponding views is also met.

If the calculated average depth is outside of the predefined smoothing threshold range from a respective subject pixel's 3D depth, then the subject pixel's respective calculated average depth is replaced into the subject pixel's 3D depth value, at step 1408. The process repeats, at step 1410, for all of the subject pixels in the particular reference view being smoothed, until the respective calculated average depth for each window is within the predefined smoothing threshold range from the respective subject pixel's 3D depth for all of the subject pixels in the reference view. In this way, the operational sequence 1210 will significantly improve the visual appearance of the 3D image to a user. This smoothing feature is especially useful for enhancing the visual appeal of homogeneous regions in a scene being viewed using 3D images.

An alternative smoothing process to the operational sequence discussed above with reference to FIG. 14, may apply a smoothing window to the subject pixels using a different approach, as will be discussed below. Each of the pixels, first of all, will already have been associated with 3D depth information and will likely also have their respective location identified relative to edge regions and to homogeneous regions of surfaces being viewed in a scene. For a particular reference view, the fixed window would be applied first to the pixels located about the edge portions in the reference view. The 3D depth information of the pixels about the edge portions, e.g., the edgels, will normally tend to have very close estimation of their true 3D depth information. The averaging calculations will result in average depth values that are very close to the subject pixel's estimation of 3D depth information. Then, the window is advanced to a neighboring pixel which is then made the subject pixel for a calculation of the neighboring non-occluded pixels' average depth. The window progressively is advanced from the edgels to pixels that are located about a homogeneous region. As the averaging calculations of neighboring pixels are progressively applied to new subject pixels deeper in the homogeneous region, i.e., by moving the window across the image of the reference view from the edge portions to the homogeneous portion, these new subject pixels within the moving window will be assigned the calculated average 3D depth information from their neighboring pixels which will likely have already been assigned a calculated average 3D depth information from the neighboring pixels about the edge portions. This further averaging of the 3D depth information being then associated with pixels deeper in the homogeneous regions will tend to assign 3D depth information to these homogeneous region pixels that is near the average 3D depth information of the pixels about the edge portions of the surfaces. The process will end when all pixels within the reference view, e.g., moving from the edge portions and then through the homogeneous portions, will have been a subject pixel with the moving window and had an opportunity to have their 3D depth information assigned from a calculated average of all of their respective non-occluded neighbor pixels. This moving window approach is an alternative embodiment to the embodiment previously discussed above. The preferred approach, as previously discussed above, simultaneously applies a window over each and every subject pixel in a reference view and iterates the averaging calculations for every subject pixel until a smoothing threshold range has been met for all subject pixels. This preferred method is very feasible for a computing system and will yield efficient processing of all subject pixels to smooth out irregularities and provide resulting 3D information that will be visually pleasing to a user.

In summary, a system and method, according to a preferred embodiment of the present invention, searches and matches corresponding pixels across a plurality of views of a scene. For each of the pixels in each scene there is associated a matching curve. The method analyzes the characteristics of the matching curves of pixels that have been corresponded across the plurality of views, and the method determines when certain pixels are occluded views. Occluded views are characterized by a high matching error and typically do not match in color or other characteristics with other corresponded pixels across the plurality of views. These occluded views will be avoided in the method steps for reconstructing 3-D information of objects in the scene.

The preferred method then locates confident seeds. Preferably, when a error region of a matching curve of a first pixel overlaps a error region of at least a second corresponding pixel from one of the other views of the scene, an image processing system determines that the voxel located at the overlapping error regions of the plurality of matching curves is a confident seed. Additionally, if the pixel associated with the voxel is located at a high contrast region, such as about an edge of an object in a scene, this additionally increases the confidence that the 3-D depth information associated with the pixel is a confident seed that can be relied upon in a process for propagating the surface of a volume in the scene. Of course, this pixel must additionally be a non-occluded view.

Next, an image processing system propagates 3D depth information from the confident seed, preferably starting with a confident seed about an edge of an object in the scene, to neighboring pixels about the confident seed. For example, as illustrated in FIG. 9, an image processing system would select a subject pixel that is the center 902 of the window grid 900 to determine the center pixel's 902 3D depth information. If the confident seed is one of the eight neighboring pixels around the center pixel 902 under analysis then the image processing system determines whether the confident seeds' depth information is within the error region (i.e. volume of uncertainty) of the subject pixel 902 at the center of the window being analyzed. If there is overlap and an error region of the subject pixel's matching curve additionally overlaps with at least one other corresponding pixel's error region in the other corresponding views of the scene then the image processing system assigns the 3D depth information of the confident seed to the subject pixel 902. In this way, the 3D information is propagated from the confident seed to the neighboring pixel 902 which is the center pixel being the subject of the present analysis.

On the other hand, if the subject pixel 902 has a error region that overlaps with at least one other corresponding pixel across the plurality of views of the scene but there is no overlap of the confident seed's 3D depth information within the error region of the subject pixel 902, then the preferred method determines that there is a discontinuity in the surfaces visible in the scene. That is, most likely the process has reached an edge between objects in a scene. In such a case, there is no propagation of the 3D depth information from the neighboring confident seed to the subject pixel's voxel. The subject pixel's voxel identifies 3D depth information for a surface that is discontinuous from the surface being propagated by the neighboring confident seed. The 3D imaging system then identifies this subject pixel 902 as a confident seed and will then propagate 3D depth information from the subject pixel 902 to it's neighboring pixels. Lastly, if the subject pixel 902 does not have a error region that overlaps with any of it's corresponding pixel's error regions across the plurality of views and also there is no overlap with the error region and the 3D depth information of the neighboring confident seed, then this pixel 902 is left alone for now as far as assigning 3D depth information. The image processing system then progresses to another neighboring pixel by moving this window 900 such as shown in FIG. 9 and analyzes another neighboring pixel to propagate 3D depth information.

Eventually, as surface propagating fronts meet with each other there will be locations where pixels have remained undetermined 3D depth information. These pixels will normally be assigned 3D depth information that has been assigned to a majority of their neighboring pixels (such as the neighboring pixels indicated in a window grid 900 about the subject pixel 902 that remains with undetermined 3D depth information). A surface continuity requirement for surface 3D depth information propagation dictates that if the neighboring pixels have a defined 3D depth information then the unknown 3D depth information of the remaining pixel must also be assigned to the same 3D depth information for matching continuity test of the common surface across all of the neighboring pixels 900. In this way, an image processing system can reliably propagate 3D depth information starting with confident seeds, preferably located near edges, to their neighboring pixels. Additionally, the propagating of 3D depth information continues through propagating fronts from high contrast regions, such as edges, to low contrast regions, such as homogeneous regions, of surfaces of volumes of objects in the scene. Finally, those remaining pixels that have not been assigned 3D depth information will have surrounding neighbors with 3D depth information that will likely determine, for meeting the continuity test requirement, what the 3D depth information must be assigned to the remaining pixels. This is a reliable and robust method for reconstructing 3D depth information from a plurality of 2D views of a scene.

Finally, a smoothing process can be operated on the 3D depth information assigned to pixels. The process is especially useful for averaging out irregularities between 3D depth information of the pixels that are found generally in low contrast, or homogeneous regions, in the 3D scene. A window, such as illustrated in FIG. 9, is preferably applied to each and every pixel in an iterative process calculating average 3D depth information of all non-occluded neighboring pixels and assigning the calculated average to the respective subject pixel until a predefined smoothing threshold range for every subject pixel has been met, as has been discussed above. Alternatively, a smoothing process can apply a moving window across pixels in a reference view, working from high contrast regions, such as edges, to low contrast regions, such as homogeneous regions, that are visible in the scene. The method determines 3D depth information for subject pixels 902 by the average of the 3D depth information of all of the non-occluded neighboring pixels 900. This additional smoothing process yields a more visually pleasing 3D image information of the scene for viewing such as by a user. This additional feature provides a significant advantage of the present invention that is not found in any known prior art.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus or integrated circuit adapted for carrying out the methods described herein—is suited, as should be obvious to those of ordinary skill in the art in view of the present discussion. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

The image processing system according to the present invention provides significant advantages over the known prior art. The present image processing system is much more consistent, reliable, and robust, at reconstructing 3D image information from multiple 2D images (views) of a scene than prior art systems. Additionally, the preferred smoothing process, according to the present invention, creates smooth 3D surfaces for volumes of objects in a scene resulting in a much more visually pleasing display to a user. This is a significant advantage over prior art systems.

Accordingly, due to the remarkable reliability and robustness in reconstruction of 3D data by 3D reconstruction systems and methods according to preferred embodiments of the present invention, a virtual walkthrough system utilizing the 3D is very feasible and desirable. Generally, a circuit supporting substrate and associated circuits, such as provided by an IC, a circuit board, and a printed circuit card, and other similar embodiments, and including the functional modules according to the present invention as discussed above, can provide a modular solution for enabling a computer system to benefit from the very consistent and reliable 3D image reconstruction and smoothing methods according to the present invention. Such electronic devices as a three dimensional scanner and a 3-dimensional video image capture system would be commercially feasible.

Furthermore, the invention may be embodied in an electrical circuit that receives signals corresponding to a plurality of 2D images and produces signals corresponding to 3D reconstructed information representative of a 3D scene being viewed by the plurality of 2D images. As an example, an electrical circuit may be included within a set-top-box interposed between a television monitor display for displaying the 3D reconstructed image information and at least one signal source such as at least one of an antenna, an RF receiver, a cable TV system, a VCR system, and a satellite receiver system. The set top box is detachable and removable from the display and signal source. Alternatively, the electrical circuit may comprise a printed circuit board. The printed circuit board may be installed within a television system, a personal computer system, and/or an entertainment system, having a standard connector for accessory cards or other image display system. In another example the electrical circuit may be included in one or more integrated circuits such as application specific integrated circuits, custom integrated circuits or arrangements of off-the-shelf integrated circuits (including microprocessors) or combinations thereof. Furthermore, the invention may be incorporated in a combination of one or more electrical circuits and computer readable information, instructions or software.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of reconstructing 3D image information from a plurality of 2D images of a scene, the method comprising the steps of: receiving a plurality of image features corresponded between different 2D views of a scene, the corresponded image features deviating between different views as a result of camera relative motion;

determining image features of the received plurality of image features that are occluded views;

determining image features of the received plurality of image features that are confident seeds associated with 3D depth information, the confident seeds being associated with reliable depth information; and propagating 3D depth information from the confident seeds to neighboring image features, while avoiding image features that have been determined to be occluded views, to reconstruct 3D image information from a plurality of 2D images scene.

2. The method of claim 1, wherein the propagating step comprises the steps of:
   locating confident seeds that are visible about high contrast regions in the scene; and
   growing surfaces of volumes of objects from the confident seeds that are visible about high contrast regions to image features that are visible about low contrast regions.

3. The method of claim 1, wherein the propagating step comprises the steps of:
   locating confident seeds that are visible about edges of objects in the scene; and
   growing surfaces of volumes of objects from the confident seeds that are visible about the edges of objects to image features that are visible about homogeneous regions in the scene.

4. The method of claim 1, wherein each of the plurality of image features corresponded between different 2D views of the scene being associated with a matching curve, and wherein the step of determining image features of the received plurality of image features that are confident seeds comprises the step of:
   finding the confident seeds by locating the characteristic-pair (one local maximum vs. one local minimum) of 3D depth values along the matching curve across the multiple views to determine the confident seed that has local minimum regions overlapping across a plurality of corresponding image features in the plurality of views.

5. The method of claim 1, wherein the step of propagating 3D depth information from the confident seeds to neighboring image features comprises the step of:
   propagating 3D depth information from the confident seeds to neighboring image features as long as a confident seed is determined to be within the neighboring image feature's volume of uncertainty, or error region.

6. A method of reconstructing 3D image information from a plurality of 2D images of a scene, the method comprising the steps of:
   receiving a plurality of image features corresponded between different 2D views of a scene, the corresponded image features deviating between different views as a result of camera relative motion;
   determining image features of the received plurality of image features that are occluded views;
   determining image features of the received plurality of image features that are confident seeds associated with 3D depth information; and
   propagating 3D depth information from the confident seeds to neighboring image features while avoiding image features that have been determined to be occluded views, to reconstruct 3D image information from a plurality of 2D images scene;
   wherein the step of propagating 3D depth information from the confident seeds to neighboring image features comprises the step of propagating 3D depth information from the confident seeds to neighboring image features as long as a confident seed is determined to be within the neighboring image feature's volume of uncertainty, or error region; and
   wherein 3D depth information is propagated from the confident seed to a neighboring image feature as long as the neighboring image feature's volume of uncertainty, or error region, substantially coincides with at least one of the confident seed's local minimum location and global minimum location.

7. The method of claim 1, wherein the plurality of image features corresponded between the different 2D views of the scene are pixels visible in the different 2D views.

8. The method of claim 1, wherein the 3D depth information for the image features represents locations of voxels associated with the image features.

9. A method of reconstructing 3D image information from a plurality of 2D images of a scene, the method comprising the steps of:
   receiving a plurality of image features corresponded between different 2D views of a scene, the corresponded image features deviating between different views as a result of camera relative motion;
   determining image features of the received plurality of image features that are occluded views;
   determining image features of the received plurality of image features that are confident seeds associated with 3D depth information; and
   propagating 3D depth information from the confident seeds to neighboring image features, while avoiding image features that have been determined to be occluded views, to reconstruct 3D image information from a plurality of 2D images scene;
   wherein the 3D depth information being determined for confident seeds and for neighboring image features is cross-checked for consistency among all of the non-occluded views at a depth-to-be-determined.

10. The method of claim 9, wherein the consistency cross-check among the non-occluded views includes:
    determining a 3D depth information for an image feature is within a local minimum region in each of a plurality of the non-occluded views.

11. The method of claim 9, wherein the consistency cross-check among the non-occluded views includes:
    determining a 3D depth information for an image feature by cross-checking that the characteristics of the subject image feature's matching curve and the characteristics of corresponding image features matching curves in other non-occluded views substantially match with each other.

12. The method of claim 9, wherein the consistency cross-check among the non-occluded views includes:
    determining a 3D depth information for an image feature by cross-checking that the characteristics of the subject image feature's matching curve and the characteristics of corresponding image features matching curves in other non-occluded views substantially match with a specified characteristics-pair.

13. The method of claim 9, wherein a cross-check among the non-occluded views includes:
    determining a 3D depth information for an image feature by cross-checking that the characteristics of the subject image feature's matching curve and the characteristics of corresponding image features matching curves in other non-occluded views substantially match with a specified characteristics-pair; and
    determining that a continuity constraint is substantially met from the subject image feature to its neighboring image features among the non-occluded views.

14. An image processing system comprising:
a memory;
a controller/processor electrically coupled to the memory;
a 3D image reconstructor, electrically coupled to the controller/processor and to the memory, for:
receiving a plurality of image features corresponded between different 2D views of a scene, the corresponded image features deviating between different views as a result of camera relative motion;
determining image features of the received plurality of image features that are occluded views;
determining image features of the received plurality of image features that are confident seeds associated with 3D depth information, the confident seeds being associated with reliable depth information; and
propagating 3D depth information from the confident seeds to neighboring image features, while avoiding image features that have been determined to be occluded views.

15. The image processing system of claim 14, further comprising at least one camera interface, electrically coupled to the controller/processor, for sending image information from at least one camera to the controller/processor.

16. The system of claim 14, wherein the controller/processor, the memory, the image feature detector, and the image matching module, are implemented in at least one of an integrated circuit, a circuit supporting substrate.

17. The image processing system of claim 14, further comprising at least one display interface for displaying a 3D image corresponding to the 3D depth information of the scene.

18. A computer readable medium including computer instructions for a 3D image reconstruction computer system, the computer instructions comprising instructions for:
receiving a plurality of image features corresponded between different 2D views of a scene, the corresponded image features deviating between different views as a result of camera relative motion;
determining image features of the received plurality of image features that are occluded views;
determining image features of the received plurality of image features that are confident seeds associated with 3D depth information, the confident seeds being associated with reliable depth information; and
propagating 3D depth information from the confident seeds to neighboring image features, while avoiding image features that have been determined to be occluded views.

19. The computer readable medium of claim 18, wherein the propagating comprises:
locating confident seeds that are visible about high contrast regions in the scene; and
growing surfaces of volumes of objects from the confident seeds that are visible about high contrast regions to image features that are visible about low contrast regions.

20. The computer readable medium of claim 18, wherein the propagating comprises:
locating confident seeds that are visible about edges of objects in the scene; and
growing surfaces of volumes of objects from the confident seeds that are visible about the edges of objects to image features that are visible about homogeneous regions in the scene.

21. The computer readable medium of claim 18, wherein each of the plurality of image features corresponded between different 2D views of the scene being associated with a matching curve, and wherein the determining image features of the received plurality of image features that are confident seeds comprises:
finding the confident seeds by locating the characteristic-pair (one local maximum vs. one local minimum) of 3D depth values along the matching curve across the multiple views to determine the confident seed that has local minimum regions overlapping across a plurality of corresponding image features in the plurality of views.

22. The computer readable medium of claim 18, wherein the propagating comprises:
propagating 3D depth information from the confident seeds to neighboring image features as long as a confident seed is determined to be within the neighboring image feature's volume of uncertainty, or error region.

23. A computer readable medium including computer instructions for a 3D image reconstruction computer system, the computer instructions comprising instructions for:
receiving a plurality of image features corresponded between different 2D views of a scene, the corresponded image features deviating between different views as a result of camera relative motion;
determining image features of the received plurality of image features that are occluded views;
determining image features of the received plurality of image features that are confident seeds associated with 3D depth information; and propagating 3D depth information from the confident seeds to neighboring image features, while avoiding image features that have been determined to be occluded views,
wherein the propagating comprises propagating 3D depth information from the confident seeds to neighboring image features as long as a confident seed is determined to be within the neighboring image feature's volume of uncertainty, or error region, and
wherein 3D depth information is propagated from the confident seed to a neighboring image feature as long as the neighboring image feature's volume of uncertainty, or error region, substantially coincides with at least one of the confident seed's local minimum location and global minimum location.

24. The computer readable medium of claim 18, wherein the plurality of image features corresponded between the different 2D views of the scene are pixels visible in the different 2D views.

25. The computer readable medium of claim 18, wherein the 3D depth information for the image features represents locations of voxels associated with the image features.

26. A computer readable medium including computer instructions for a 3D image reconstruction computer system, the computer instructions comprising instructions for:
receiving a plurality of image features corresponded between different 2D views of a scene, the corresponded image features deviating between different views as a result of camera relative motion;
determining image features of the received plurality of image features that are occluded views;
determining image features of the received plurality of image features that are confident seeds associated with 3D depth information; and propagating 3D depth information from the confident seeds to neighboring image features, while avoiding image features that have been determined to be occluded views, wherein the 3D depth information being determined for confident seeds and for neighboring image features is cross-checked for consistency among all of the non-occluded views at a depth-to-be-determined.

27. The computer readable medium of claim 26, wherein the consistency cross-check among the non-occluded views includes:

determining a 3D depth information for an image feature is within a local minimum region in each of a plurality of the non-occluded views.

28. The computer readable medium of claim 26, wherein the consistency cross-check among the non-occluded views includes:

determining a 3D depth information for an image feature by cross-checking that the characteristics of the subject image features matching curve and the characteristics of corresponding image features matching curves in other non-occluded views substantially match with each other.

29. The computer readable medium of claim 26, wherein the consistency cross-check among the non-occluded views includes:

determining a 3D depth information for an image feature by cross-checking that the characteristics of the subject image feature's matching curve and the characteristics of corresponding image features matching curves in other non-occluded views substantially match with a specified characteristics-pair.

30. The computer readable medium of claim 26, wherein a cross-check among the non-occluded views includes:

determining a 3D depth information for an image feature by cross-checking that the characteristics of the subject image feature's matching curve and the characteristics of corresponding image features matching curves in other non-occluded views substantially match with a specified characteristics-pair; and determining that a continuity constraint is substantially met from the subject image feature to its neighboring image features among the non-occluded views.

31. An electrical device comprising:

a data memory;

a program memory including computer instructions for 3D image reconstruction; and a controller/processor, electrically coupled to the first interface, the data memory and the program memory, for storing image information corresponding to a plurality of image features corresponded between different 2D views of a scene, the corresponded image features deviating between different views as a result of camera relative motion;

determining image features of the stored plurality of image features that are occluded views;

determining image features of the stored plurality of image features that are confident seeds associated with 3D depth information, the confident seeds being associated with reliable depth information; and propagating 3D depth information from the confident seeds to neighboring image features, while avoiding image features that have been determined to be occluded views.

32. The electrical device of claim 31, further comprising:

a display interface, electrically coupled to the controller/processor, for providing 3D image display information, that corresponds to the 3D depth information, to a display.

33. The electrical device of claim 32, wherein the display interface provides 3D image display information to a display for a virtual walkthrough or the scene.

34. The electrical device of claim 31, wherein the electrical device comprises at least one of an integrated circuit and a circuit supporting substrate.

35. The electrical device of claim 31, further comprising at least one camera interface for receiving image information from at least one camera.

* * * * *